US012580667B2

(12) United States Patent
Bryant et al.

(10) Patent No.:    US 12,580,667 B2
(45) Date of Patent:        Mar. 17, 2026

(54) WELLSITE MONITORING SYSTEM WITH WELLSITE TRACKER AND METHOD OF USING SAME

(71) Applicant: GR Energy Services Management, LP, Sugar Land, TX (US)

(72) Inventors: Cameron Michael Bryant, Sugar Land, TX (US); James William Anthony, Missouri City, TX (US); Julio C. Guerrero, Cambridge, MA (US); Jeffree Sea Dickinson, Sugar Land, TX (US)

(73) Assignee: GR Energy Services Management, LP, Sugar Land, TX (US)

( * ) Notice: Subject to any disclaimer, the term of this patent is extended or adjusted under 35 U.S.C. 154(b) by 0 days.

(21) Appl. No.: 18/271,441

(22) PCT Filed: Jan. 9, 2022

(86) PCT No.: PCT/US2022/011740

§ 371 (c)(1),
(2) Date: Jul. 7, 2023

(87) PCT Pub. No.: WO2023/132836

PCT Pub. Date: Jul. 13, 2023

(65) Prior Publication Data

US 2024/0396645 A1      Nov. 28, 2024

(51) Int. Cl.
*H04B 17/23*        (2015.01)
*E21B 41/00*        (2006.01)
*E21B 47/00*        (2012.01)

(52) U.S. Cl.
CPC ............. *H04B 17/23* (2015.01); *E21B 41/00* (2013.01)

(58) Field of Classification Search
CPC ...................................................... H04B 17/23
See application file for complete search history.

(56)                References Cited

U.S. PATENT DOCUMENTS

| | | | |
|---|---|---|---|
| 1,106,675 | A | 8/1914 | Henry |
| 2,409,811 | A | 10/1946 | Taylor et al. |
| | | (Continued) | |

FOREIGN PATENT DOCUMENTS

| | | |
|---|---|---|
| CN | 203742568 U | 7/2014 |
| DE | 102006039096 | 1/2008 |
| | (Continued) | |

OTHER PUBLICATIONS

GR Energy Services, ZipSet Setting Tool, dated Jan. 3, 2018, p. 1.
(Continued)

*Primary Examiner* — Davetta W Goins
*Assistant Examiner* — Pameshanand Mahase
(74) *Attorney, Agent, or Firm* — JL Salazar

(57)                ABSTRACT

A wellsite tracker includes a tracker housing, location antenna, location unit, and tracker communicator. The location antenna is coupled to satellites to receive location data. The location unit includes a clock and a location processor to infer tracking data based on the location data and the time. The tracker communicator includes a communication unit and a communication antenna. The communication antenna is coupled to the location unit by the communication unit to receive the tracking data and to transmit the tracking data about the wellsite. Wellsite monitoring involves using the wellsite tracker to receive location data from satellites as the wellsite equipment moves about the wellsite, to inferring tracking data for the wellsite equipment based on the location data over time, and to confirm wellsite operations by comparing the tracking data for the wellsite equipment with predetermined specifications.

28 Claims, 12 Drawing Sheets

(56) References Cited

U.S. PATENT DOCUMENTS

| | | | |
|---|---|---|---|
| 2,705,159 A | 3/1955 | Pfau | |
| 3,024,843 A | 3/1962 | Vaughan | |
| 3,062,292 A | 11/1962 | Lowrey et al. | |
| 3,211,222 A | 10/1965 | Myers | |
| 3,713,393 A | 1/1973 | O'Connor et al. | |
| 3,966,236 A | 6/1976 | Vann | |
| 4,497,224 A | 2/1985 | Jurgens | |
| 4,776,393 A | 10/1988 | Forehand et al. | |
| 4,844,161 A | 7/1989 | Rankin et al. | |
| 5,040,619 A | 8/1991 | Jordan et al. | |
| 5,242,201 A | 9/1993 | Beeman | |
| 5,484,029 A | 1/1996 | Eddison | |
| 5,617,926 A | 4/1997 | Eddison et al. | |
| 5,984,006 A | 11/1999 | Read et al. | |
| 6,095,583 A | 8/2000 | Beeman et al. | |
| 6,216,789 B1 | 4/2001 | Lorsignol et al. | |
| 6,216,802 B1 | 4/2001 | Sawyer | |
| 6,431,269 B1 | 8/2002 | Post et al. | |
| 6,450,541 B1 | 9/2002 | Bakke | |
| 6,520,089 B1 | 2/2003 | Avanci et al. | |
| 6,543,538 B2 | 4/2003 | Tolman et al. | |
| 6,995,682 B1 | 2/2006 | Chen et al. | |
| 7,198,101 B2 | 4/2007 | McGarian et al. | |
| 7,409,987 B2 | 8/2008 | Fjelde | |
| 7,810,569 B2 | 10/2010 | Hill et al. | |
| 7,896,083 B2 | 3/2011 | Vickery | |
| 8,267,012 B2 | 9/2012 | Peeters et al. | |
| 8,960,093 B2 | 2/2015 | Preiss et al. | |
| 9,127,545 B2 | 9/2015 | Kajaria et al. | |
| 9,206,675 B2 | 12/2015 | Hales et al. | |
| 9,581,422 B2 | 2/2017 | Preiss et al. | |
| 9,605,937 B2 | 3/2017 | Eitschberger et al. | |
| 9,617,829 B2 | 4/2017 | Dale et al. | |
| 9,810,035 B1 | 11/2017 | Carr et al. | |
| 9,822,596 B2 | 11/2017 | Clemens et al. | |
| 9,822,618 B2 | 11/2017 | Eitschberger | |
| 9,903,185 B2 | 2/2018 | Ursi et al. | |
| 9,915,513 B1 | 3/2018 | Zemla et al. | |
| 10,036,236 B1 | 7/2018 | Sullivan et al. | |
| 10,309,199 B2 | 6/2019 | Eitschberger | |
| 10,329,858 B1 | 6/2019 | He et al. | |
| 10,365,079 B2 | 7/2019 | Harrington et al. | |
| 10,507,433 B2 | 12/2019 | Eitschberger et al. | |
| 10,626,689 B2 | 4/2020 | Moyes | |
| 10,689,931 B2 | 6/2020 | Mickey et al. | |
| 10,760,384 B2 | 9/2020 | Schmidt et al. | |
| 10,794,122 B2 | 10/2020 | Kitchen et al. | |
| 10,844,678 B2 | 11/2020 | Mickey et al. | |
| 10,858,919 B2 | 12/2020 | Anthony et al. | |
| 11,053,757 B2 | 7/2021 | Lubojasky, Jr. et al. | |
| 11,073,005 B2 | 7/2021 | Schmidt et al. | |
| 11,078,763 B2 | 8/2021 | Anthony et al. | |
| 12,123,273 B1 | 10/2024 | Roach et al. | |
| 2002/0156582 A1* | 10/2002 | Newman | E21B 41/00 702/5 |
| 2003/0102162 A1 | 6/2003 | Sloan et al. | |
| 2003/0196798 A1 | 10/2003 | Newman | |
| 2003/0196806 A1 | 10/2003 | Hromas et al. | |
| 2004/0134667 A1 | 7/2004 | Brewer et al. | |
| 2005/0067169 A1 | 3/2005 | Wills | |
| 2006/0048940 A1 | 3/2006 | Hromas et al. | |
| 2006/0070739 A1 | 4/2006 | Brooks et al. | |
| 2006/0278394 A1 | 12/2006 | Stover | |
| 2007/0056746 A1* | 3/2007 | Newman | E21B 19/165 166/383 |
| 2007/0294034 A1* | 12/2007 | Bratton | E21B 43/00 702/6 |
| 2008/0264649 A1 | 10/2008 | Crawford | |
| 2011/0030942 A1 | 2/2011 | Orgeron | |
| 2012/0247769 A1 | 10/2012 | Schacherer et al. | |
| 2013/0008669 A1 | 1/2013 | Deere et al. | |
| 2013/0076907 A1* | 3/2013 | Hobbs | H04N 7/185 348/158 |
| 2013/0138254 A1 | 5/2013 | Seals et al. | |
| 2014/0033939 A1 | 2/2014 | Priess et al. | |

| | | | |
|---|---|---|---|
| 2014/0126979 A1 | 5/2014 | Hill et al. | |
| 2014/0234059 A1 | 8/2014 | Thomeer | |
| 2015/0247368 A1 | 9/2015 | Clemens et al. | |
| 2015/0345272 A1* | 12/2015 | Kajaria | E21B 47/00 166/308.1 |
| 2015/0345922 A1 | 12/2015 | Lanclos et al. | |
| 2016/0047199 A1 | 2/2016 | Hardesty et al. | |
| 2016/0061572 A1 | 3/2016 | Eitschberger et al. | |
| 2016/0115753 A1 | 4/2016 | Frazier et al. | |
| 2016/0208566 A1 | 7/2016 | Bowley et al. | |
| 2016/0356132 A1 | 12/2016 | Burmeister et al. | |
| 2016/0356432 A1 | 12/2016 | Scribante et al. | |
| 2016/0376808 A1 | 12/2016 | Magnuson et al. | |
| 2017/0030693 A1 | 2/2017 | Preiss et al. | |
| 2017/0044875 A1 | 2/2017 | Hebebrand et al. | |
| 2017/0074078 A1 | 3/2017 | Eitschberger | |
| 2018/0038208 A1 | 2/2018 | Eitschberger | |
| 2018/0080298 A1 | 3/2018 | Covalt et al. | |
| 2018/0224260 A1 | 8/2018 | Zemla et al. | |
| 2018/0258724 A1 | 9/2018 | Massey et al. | |
| 2018/0266241 A1* | 9/2018 | Ferguson | E21B 44/00 |
| 2018/0299239 A1 | 10/2018 | Eitschberger et al. | |
| 2019/0016969 A1 | 1/2019 | Kandel et al. | |
| 2019/0086189 A1 | 3/2019 | Eitschberger et al. | |
| 2019/0106969 A1 | 4/2019 | Sullivan et al. | |
| 2019/0127290 A1 | 5/2019 | Document | |
| 2019/0178045 A1 | 6/2019 | Document | |
| 2019/0211664 A1 | 7/2019 | Document | |
| 2019/0234189 A1 | 8/2019 | Document | |
| 2019/0242209 A1 | 8/2019 | Document | |
| 2019/0242222 A1 | 8/2019 | Document | |
| 2019/0277103 A1 | 9/2019 | Document | |
| 2019/0330947 A1 | 10/2019 | Document | |
| 2019/0376775 A1 | 12/2019 | Document | |
| 2020/0024920 A1 | 1/2020 | Varkey et al. | |
| 2020/0024935 A1 | 1/2020 | Document | |
| 2020/0032601 A1 | 1/2020 | Document | |
| 2020/0048996 A1 | 2/2020 | Anthony et al. | |
| 2020/0063537 A1 | 2/2020 | Langford et al. | |
| 2020/0072029 A1 | 3/2020 | Anthony et al. | |
| 2020/0088005 A1 | 3/2020 | Brunty et al. | |
| 2020/0182025 A1 | 6/2020 | Brady | |
| 2020/0256166 A1 | 8/2020 | Knight et al. | |
| 2020/0277837 A1 | 9/2020 | Hern et al. | |
| 2020/0362652 A1 | 11/2020 | Eitschberger et al. | |
| 2021/0002995 A1 | 1/2021 | Botnan et al. | |
| 2021/0039354 A1 | 2/2021 | Tokuda et al. | |
| 2021/0040805 A1 | 2/2021 | Kehoe et al. | |
| 2021/0047903 A1 | 2/2021 | Albert | |
| 2021/0123311 A1 | 4/2021 | Rosenthal | |
| 2021/0262315 A1* | 8/2021 | Beason | E21B 43/2607 |
| 2021/0398354 A1 | 12/2021 | Konchenko et al. | |
| 2022/0145732 A1 | 5/2022 | Anthony et al. | |
| 2024/0035347 A1 | 2/2024 | Zakharia et al. | |
| 2024/0060369 A1 | 2/2024 | Bryant et al. | |
| 2024/0254846 A1 | 8/2024 | Bryant et al. | |
| 2024/0254847 A1 | 8/2024 | Bryant et al. | |
| 2024/0254848 A1 | 8/2024 | Bryant et al. | |
| 2024/0254849 A1 | 8/2024 | Bryant et al. | |

FOREIGN PATENT DOCUMENTS

| | | | |
|---|---|---|---|
| EP | 0015931 A1 | 10/1980 | |
| WO | 1979000704 | 9/1979 | |
| WO | 2009023042 A1 | 2/2009 | |
| WO | 2014028317 A1 | 2/2014 | |
| WO | 2022150670 A1 | 7/2022 | |

OTHER PUBLICATIONS

Renegade Services, GUNHANDLER, dated at least as early as Nov. 29, 2020, pp. 1-7.

Response to Saudi Arabia Office Action, dated Jun. 19, 2025, pp. 1-9.

Saudi Arabia Office Action with translation, dated Mar. 27, 2025, pp. 1-10.

(56)         References Cited

OTHER PUBLICATIONS

WIPO International Search Report and Written Opinion dated Apr. 28, 2022, pp. 1-11.

* cited by examiner

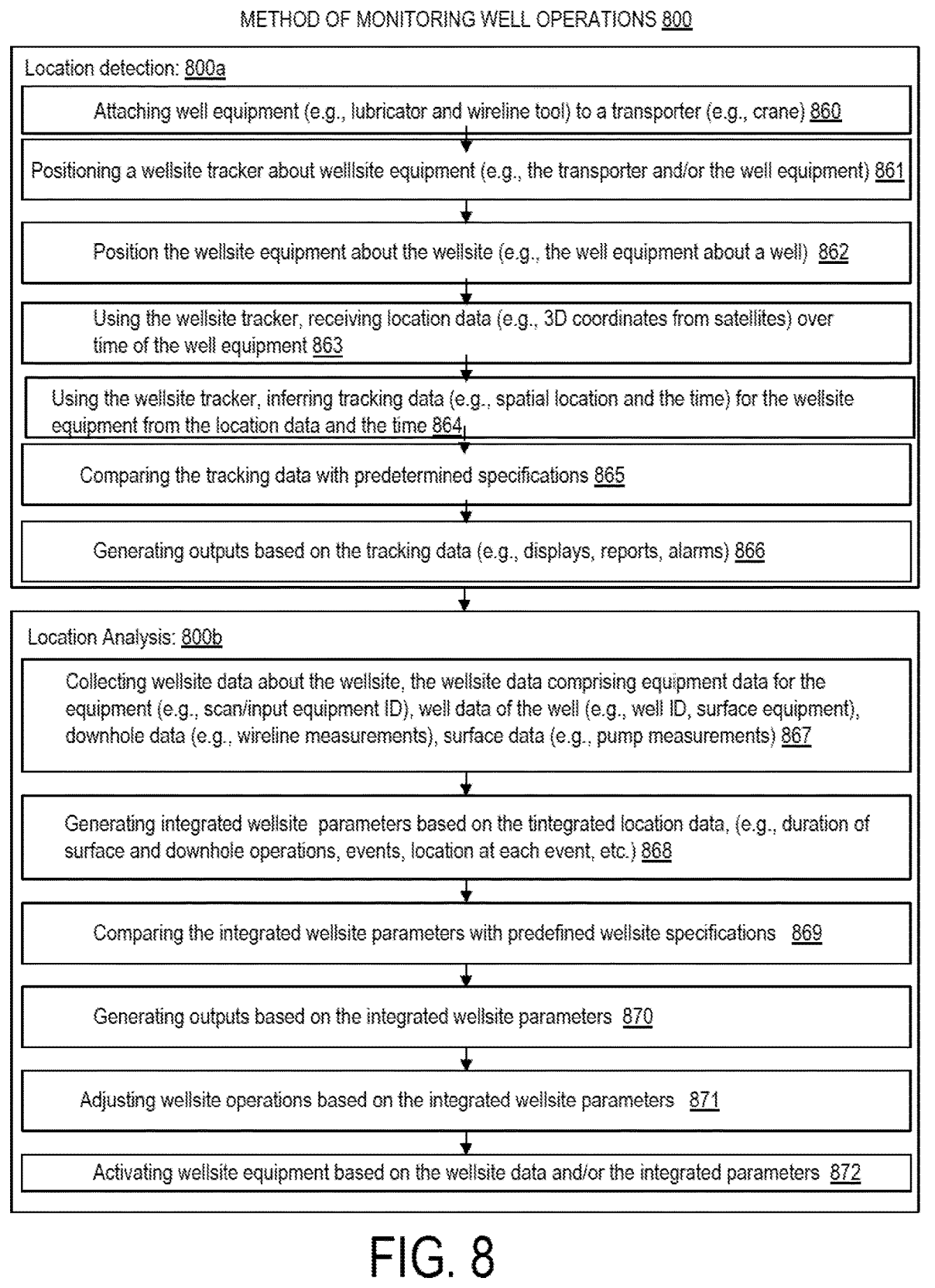

METHOD OF MONITORING WELL OPERATIONS 800

Location detection: 800a

Attaching well equipment (e.g., lubricator and wireline tool) to a transporter (e.g., crane) 860

Positioning a wellsite tracker about welllsite equipment (e.g., the transporter and/or the well equipment) 861

Position the wellsite equipment about the wellsite (e.g., the well equipment about a well) 862

Using the wellsite tracker, receiving location data (e.g., 3D coordinates from satellites) over time of the well equipment 863

Using the wellsite tracker, inferring tracking data (e.g., spatial location and the time) for the wellsite equipment from the location data and the time 864

Comparing the tracking data with predetermined specifications 865

Generating outputs based on the tracking data (e.g., displays, reports, alarms) 866

Location Analysis: 800b

Collecting wellsite data about the wellsite, the wellsite data comprising equipment data for the equipment (e.g., scan/input equipment ID), well data of the well (e.g., well ID, surface equipment), downhole data (e.g., wireline measurements), surface data (e.g., pump measurements) 867

Generating integrated wellsite parameters based on the tintegrated location data, (e.g., duration of surface and downhole operations, events, location at each event, etc.) 868

Comparing the integrated wellsite parameters with predefined wellsite specifications 869

Generating outputs based on the integrated wellsite parameters 870

Adjusting wellsite operations based on the integrated wellsite parameters 871

Activating wellsite equipment based on the wellsite data and/or the integrated parameters 872

FIG. 8

WELLSITE MONITORING SYSTEM WITH WELLSITE TRACKER AND METHOD OF USING SAME

CROSS-REFERENCE TO RELATED APPLICATIONS

This application is a national stage application, filed under 35 U.S.C. § 371, of International Patent Application No. PCT/US2022/011740, filed on Jan. 9, 2022, which is incorporated by reference herein in its entirety.

BACKGROUND

The present disclosure relates generally to oilfield technology. More specifically, the present disclosure relates to devices, such as sensors, for sensing and/or monitoring wellsite operations.

Wellsite operations are performed to locate and access subsurface targets, such as valuable hydrocarbons. Drilling equipment is positioned at the surface and a downhole drilling tool is advanced into the subsurface formation to form a wellbore. Once drilled, casing may be inserted into the wellbore and cemented into place to complete a well. Once the well is completed, production equipment may be deployed into the wellbore to facilitate production of fluid to the surface for capture.

Various equipment may be used to perform the wellsite operations. Examples of equipment used at wellsites are provided in Patent/Application Nos. US2020/0072029, US2006/0278394, U.S. Pat. No. 10,329,858, WO2014028317, U.S. Pat. Nos. 6,216,789, 6,995,682, US2013/0138254, and U.S. Pat. No. 9,127,545, the entire contents of which is hereby incorporated by reference herein to the extent not inconsistent with the present disclosure. The equipment may include, for example, downhole drilling and other tools deployed into the earth. Examples of downhole tools are provided in US Patent/Application No. 2020/0024935; U.S. Pat. Nos. 10,507,433; 10,036,236; 2020/0072029; US2020/0048996; 2016/0115753; 2020/0277837; 20190376775; 20190330947; 20190242222; 20190234189; U.S. Pat. Nos. 10,309,199; 20190127290; 20190086189; 20180299239; 20180224260; U.S. Pat. Nos. 9,915,513; 20180038208; 9,822,618; 9,605,937; 20170074078; 9,581,422; 20170030693; 20160356432; 20160061572; 8,960,093; 20140033939; 8,267,012; 6,520,089; 20160115753; 20190178045; and U.S. Pat. No. 10,365,079, the entire contents of which is hereby incorporated by reference herein to the extent not inconsistent with together. Examples of assembly techniques are provided in U.S. Pat. Nos. 7,896,083; 9,206,675; and 9,581,422, the entire contents of which is hereby incorporated by reference herein to the extent not inconsistent with the present disclosure.

Various devices may be used with the equipment at the wellsite. For example, devices are used to move the equipment to a desired location. Examples of such devices are provided in U.S. Pat. Nos. 6,543,538, 9,617,829, WO2009/023042, WO2014028317, and U.S. Pat. No. 6,216,789 the entire contents of which is hereby incorporated by reference herein to the extent not inconsistent with the present disclosure. Devices are also used to collect measurements at the wellsite. Examples of such devices are provided in Patent/Application Nos. US2019/0211664 and US20080264649, the entire contents of which is hereby incorporated by reference herein to the extent not inconsistent with the present disclosure.

Despite the advancements in downhole technology, there remains a need for techniques for reliably collecting pertinent wellsite information and for confirming wellsite operations. The present disclosure is directed at providing such needs.

SUMMARY

In at least one aspect, the present disclosure relates to a wellsite tracker. The wellsite tracker comprises a tracker housing; a communication unit positioned in the tracker housing; and a location unit. The location unit is positioned in the tracker housing to collect location data. The location unit comprises a three-axis location sensor. The location data comprises spatial location and time.

In another aspect, the disclosure relates to a wellsite monitoring system. This system comprises the wellsite tracker and a wellsite monitor. The wellsite monitor is communicatively coupled to the communication unit to receive the location data therefrom. The wellsite monitor comprises a central processor to generate outputs based on the location data.

The disclosure also relates to a wellsite tracker, a wellsite monitoring system, and methods of monitoring wellsite operations as described herein.

The method of monitoring wellsite operations comprises positioning a wellsite tracker about a transporter; positioning the transporter about the wellsite; using the wellsite tracker, detecting location data; and generating outputs based on the location data. The outputs comprise an inferred location of well equipment.

In another aspect, the disclosure relates to a wellsite tracker for tracking wellsite equipment at a wellsite. The wellsite tracker comprises a tracker housing, a location antenna, a location unit, and a communication unit. The tracker housing is positionable on the wellsite equipment. The tracker housing has an antenna chamber and a component chamber. The component chamber is isolated from the antenna chamber by a barrier. The location antenna is positioned in the antenna chamber. The location antenna is coupled to a plurality of coordinate satellites to receive location data therefrom. The location data comprises three-axis coordinate data. The location unit is positioned in the component chamber and coupled to the location antenna to receive the location data therefrom. The location unit comprises a clock and a location processor to receive the location data over time and to infer tracking data based on the location data and the time. The tracking data comprises spatial location and the time of the wellsite equipment based on the location data. The tracker communicator comprises a communication unit and a communication antenna. The communication unit is positioned in the component chamber and coupled to the location unit to receive the tracking data therefrom. The communication antenna is positioned in the antenna chamber and coupled to the communication unit to receive the tracking data therefrom. The communication antenna extends through the tracker housing to transmit the tracking data about the wellsite.

In another aspect, the disclosure relates to a wellsite monitoring system for monitoring wellsite equipment at a wellsite. The wellsite monitoring system comprises the wellsite tracker; and a wellsite monitor. The wellsite monitor is coupled to the communication antenna of the wellsite tracker to receive the tracking data therefrom. The wellsite monitor comprises a monitor processor to generate outputs based on the location data.

Finally, in another aspect, the disclosure relates to a method of monitoring wellsite operations at a wellsite. The method comprises positioning a wellsite tracker about wellsite equipment at the wellsite, the wellsite equipment comprising a transporter; using the wellsite tracker, receiving location data from a plurality of satellites as the wellsite equipment moves about the wellsite; inferring tracking data for the wellsite equipment based on the location data over time, the tracking data comprising spatial location and the time of the wellsite equipment; and confirming wellsite operations by comparing the tracking data for the wellsite equipment with predetermined specifications.

This Summary is not intended to be limiting and should be read in light of the entire disclosure including text, claims and figures herein.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIG. 8 is a flow chart depicting a method of monitoring wellsite operations.

DETAILED DESCRIPTION

Figure 1A:
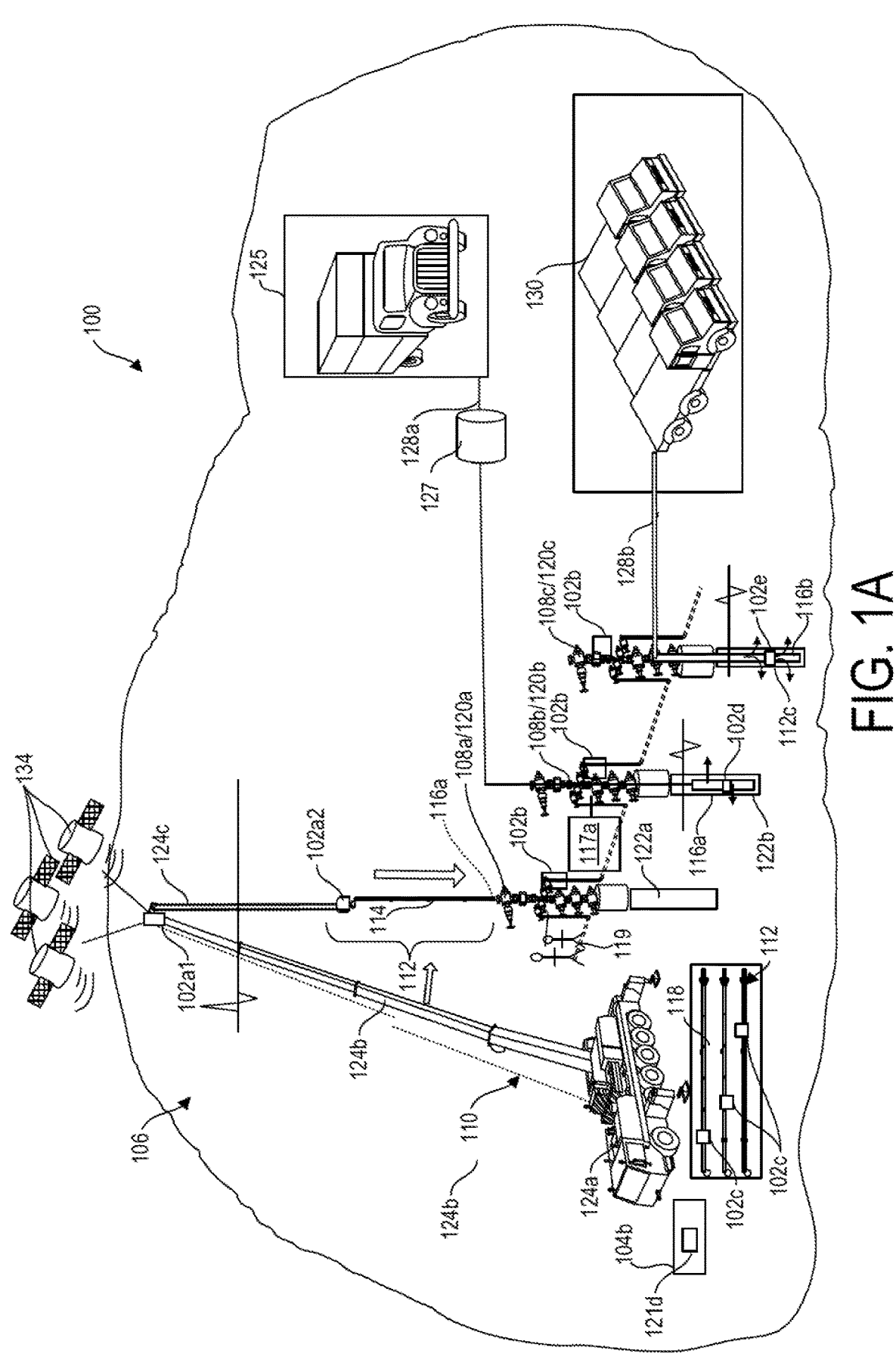
FIG. 1A is a schematic diagram depicting a wellsite with wellsite equipment having wellsite trackers.

The description that follows includes exemplary apparatus, methods, techniques, and/or instruction sequences that embody techniques of the present subject matter. However, it is understood that the described embodiments may be practiced without these specific details.

The present disclosure relates to a wellsite monitoring system including a wellsite tracker (well locator) and a wellsite monitor. The wellsite tracker may be located about a transporter, well equipment carried by the transporter, and/or other wellsite equipment. The wellsite tracker may include a location unit (e.g., a global positioning sensor (GPS) and processor), a communication unit (e.g., a transceiver), a location memory (e.g., database), and a power source (e.g., a battery) housed in a tracker housing. The wellsite tracker may be used to track a spatial location of the transporter (and/or the well equipment carried by the transporter) versus time as the transporter moves about a well. This information may be used, for example, to determine by inference where the well equipment is located during the wellsite operations. This information may also capture time at each location for correlation with data of other equipment around the well site.

The wellsite monitor may be coupled (by wire or wirelessly) to the wellsite tracker to capture and process tracker (and/or other) data captured by the wellsite tracker. The wellsite monitor may be used, for example, to monitor the location versus time of the transporter (and/or the well equipment carried by the transporter). The wellsite monitor may also be used to process (e.g., analyze) various data. For example, the tracker data may be compared with other data, such as well equipment data (e.g., tool ID, tool type, etc.), well data (e.g., well ID, well location, etc.), wireline data (e.g., perforation logs, perforation location, etc.), fracking data (e.g., pump rates, pump logs, etc.), to confirm operating conditions (e.g., the proper equipment is at the proper well, operations are performed timely, etc.).

The wellsite monitor may also be coupled to various sensors and/or monitors located about the wellsite, and/or at offsite locations. The wellsite monitor may combine and/or analyze sensor data and/or analyzed outputs gathered from the wellsite tracker and other well devices (e.g., downhole, surface, offsite, and/or other sensors, databases, and/or monitors). The wellsite monitor may then generate outputs (e.g., displays, reports, alarms, etc.) based on the collected and/or processed data.

The wellsite monitoring system and/or methods described herein are also intended to provide one or more of the following, among others: determining location of well equipment versus time, confirming proper equipment is provided to a correct location, providing alarms for improper equipment and/or out of specification conditions, identifying equipment placement at various times, considering equipment location data with other wellsite data, detecting job delays, providing security for locating well equipment, providing outputs (e.g., displays, reports, alarms, etc.) concerning location and other data, etc.

Figure 1B:
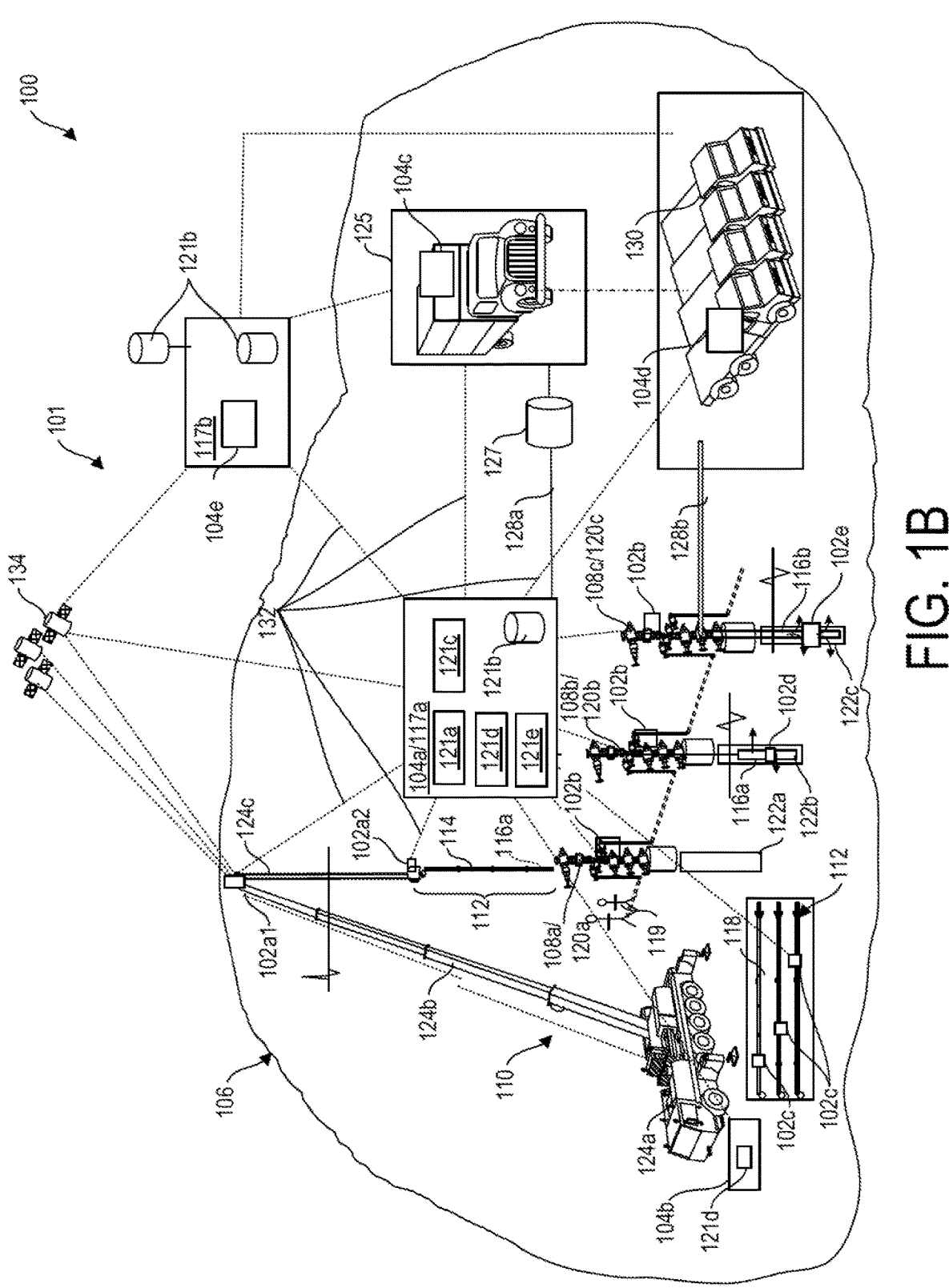
FIG. 1B is a schematic diagram depicting the wellsite of FIG. 1A with a wellsite monitoring system.

FIGS. 1A and 1B show example wellsite operations using wellsite trackers 102a1,a2. FIG. 1A is a schematic diagram depicting a wellsite 100 with wellsite equipment having wellsite trackers 102a1,a2. The wellsite 100 includes a well pad 106 with three wells 108a-c. In the example shown, each of the three wells 108a-c are production wells with surface equipment 120a-c positioned about subsurface wellbores 122a-c, respectively. In this example, the surface equipment 120a-c includes a Christmas tree with valving positioned about an opening of the wellbores 122a-c. Each of the wellbores 122a-c may be open or cased wellbores drilled into subsurface formations.

A transporter 110 is shown at the well pad 106 for delivering well equipment 112 to the well(s) 108a-c at the well pad 106. In the example shown, the transporter 110 is a crane capable of transporting (e.g., receiving, securing, lifting, moving, and delivering) the well equipment 112. For example, the transporter 110 may receive the well equipment 112 from onsite or offsite locations, and then move the well equipment 112 to a select location, such as to one of the wells 108a-c. The transporter 110 may include a vehicle 124a for moving the transporter 110 into position to the select location, a boom 124b carried by the vehicle 124a for extending the well equipment 112 about the select location, and a hoist 124c for lifting/lowering the well equipment 112 about the boom 124b.

The well equipment 112 may be stored in tool storage 118 at the well pad 106, or at an offsite location. The tool storage 118 may be any location and/or structure, such as a container, warehouse, platform, etc., capable of holding the well equipment 112. The well equipment 112 may be any equipment carried by the transporter 110 and/or used at the well pad 106, such as a lubricator 114 and/or any downhole tool 116*a-b*. In the example shown, the well equipment 112 includes a lubricator 114, a wireline tool 116*a*, and an injection tool 116*b*.

The lubricator 114 may be a tubular member connectable to the surface equipment 120*a-c* at the wells 108*a-c*. The lubricator 114 may also be used to host the wireline tool 116*a* therein during storage and/or transport. The wireline tool 116*a* may be a downhole tool (e.g., perforating, setting, plugging, etc.) for performing downhole operations, such as downhole perforation, at the wells 108*a-c*. The wireline tool 116*a* may also perform other functions while downhole, such as testing, measuring, communicating, etc. Examples of lubricators, wireline tools, and production equipment are described in U.S. Pat. Nos. 6,543,538 and 9,617,829, previously incorporated by reference herein.

As shown in FIG. 1A, the wells 108*a-c* may be used for performing various wellsite operations. The first well 108*a* shows the transporter 110 delivering the well equipment 112 to the well 108*a*. The transporter 110 carries the well equipment 112 from the tool storage 118 and to the well 108*a*. At the well 108, the transporter 110 positions the well equipment 112 above the surface equipment 120*a* for connection thereto. Once in position, the lubricator 114 may be secured to the surface equipment 120*a*, and activated to release the wireline tool 116*a*.

The second well 108*b* shows the lubricator 114 removed and the wireline tool 116*a* deployed into the wellbore 122*b* for performing downhole operations. In this example, the wireline tool 116*a* is a perforation tool for launching shaped charges into the wall of the wellbore 122*b* to form perforations in the surrounding formation. The wireline tool 116*a* is coupled to a wireline truck 125 positioned at the well pad 106. The wireline truck 125 may be a vehicle coupled to the wireline tool 116*a* via a conveyance (e.g., wireline) 128*a*. The wireline 128*a* may be movably connected to a winch 127 and coupled to the wireline truck 125. The wireline 128*a* may also be connected to the wireline tool 116*a* for supporting the wireline tool 116*a* in the wellbore 122*b* during operation. The wireline 128*a* may be capable of passing signals (e.g., power, communication, etc.) between the wireline tool 116*a* and the wireline truck 125.

The third well 108*c* shows the injection tool 116*b* positioned in the wellbore 122*c* for performing downhole operations. As demonstrated by this well 108*c*, various tools may be used in the wellbore 122*c* with various equipment. In this example, the injection tool 116*b* is used for pumping injecting fluids into the wellbore 122*c* to fracture the surrounding formation and facilitate production of fluids. The injection tool 116*b* may be deployed in the wellbore 122*c* via a tubing 128*b*. The tubing 128*b* may be a fluid conduit connected to the injection tool 116*b* at one end and to an injection truck 130 at the surface. The injection truck 130 may include one or more trucks positioned at the well pad 106 for storing, mixing, and pumping injection fluids through the tubing 128*b*, through the injection tool 116*b*, and into the wellbore 122*c*. The injection truck 130 may be communicatively connected to the tubing 128*b* and/or the injection tool 116*b*.

The wells 108*a-c* may have a surface unit 117*a* for operating equipment at each of the wells 108*a-c*. The surface unit 117*a* may be standard equipment used for operating the wells 108*a-c*, such as hydraulic, electronic, and/or other processors (e.g., central processing units (CPUs)). The surface unit 117*a* may be capable of operating wellsite equipment at the wells 108*a-c*, such as the surface equipment 120*a-c*, the lubricator 114, the wireline tool 116*a*, etc. A crew 119 of one or more workers may also be provided to operate the surface unit 117*a* and/or to perform wellsite operations at the wells 108*a-c*.

FIG. 1B is a schematic diagram depicting the wellsite of FIG. 1A with a wellsite monitoring system 101. The monitoring system 101 may include (or be coupled to) the wellsite tracker(s) 102*a*1,*a*2 and other wellsite sensors 102*b-e*. The monitoring system 101 may also include monitors 104*b-d* for collecting and analyzing well data, and/or for generating well outputs, such as well location and well confirmations as is described further herein.

The wellsite monitoring system 101 includes various sensors 102*a*1-*e* and wellsite monitors 104*a-e*. The sensors 102*a*1-*e* and the wellsite monitors 104*a-e* are communicatively coupled by communication links 132 as schematically indicated by the dotted lines. The communication links 132 may be used to create a communication network with various onsite or offsite facilities. The communication links 132 may be wired or wireless links. The communication links 132 may be conveyed by devices, such as satellites 134. While three (3) satellites 134 are shown, one or more satellites 134 may be used. The communication links 132 may extend between any of the devices shown, and may be conveyed directly or via another device. For example, the communication link 132 may extend directly from the wellsite trackers 102*a*1,*a*2 to the wellsite monitor 104*c*, and/or from the wellsite trackers 102*a*1,*a*2 to the wellsite monitor 104*a* and then on to the wellsite monitor 104*c*.

One or more of the sensors 102*a*1-*e* may be positioned about the well pad 106 for collecting and communicating data concerning the wells 108*a-c*, the well equipment 112, the surface equipment 120*a-c*, etc. Each of the sensors 102*a*1-*e* may include a gauge for measuring various parameters and a memory for storing the parameters. The sensors 102*a*1-*e* may include, for example, the wellsite tracker(s) (transporter sensor) 102*a*1,*a*2, a well sensor 102*b*, an equipment sensor 102*c*, a wireline sensor 102*d*, and an injection sensor 102*e*.

Each of the sensors 102*a*1-*e* may be positioned about the wellsite 100 to gather information concerning one or more wellsite parameters. The wellsite tracker 102*a*1,*a*2 may be positioned at various locations about the transporter 110 and/or the well equipment 112 carried by the transporter 110. For example, the wellsite trackers 102*a*1,*a*2 may be located about the vehicle 124*a*, the boom 124*b*, the hoist 124*c*, the lubricator 114, the wireline tool 116*a*, etc. The wellsite trackers 102*a*1,*a*2 may also be positioned about the wellsite 100 to track movement of equipment, personnel, etc. The wellsite trackers 102*a*1,*a*2 may be provided with capabilities for collecting and storing transporter parameters (e.g., location data and time) concerning the transporter 110, the well equipment 112 carried by the transporter, the wells 108*a-c*, or other aspects of the wellsite 100 as is described further herein.

The well sensor 102*b* may be a sensor positioned at one of the wells 108*a-c* for measuring data concerning operation of the wells 108*a-c*. For example, the well sensor 102*b* may be coupled to the surface equipment 120*a-c* to measure pressures of fluids, detect pumping conditions, detect equipment position, etc. The well sensor 102*b* may also collect well parameters concerning the well(s) 108*a-c*, such as well location, equipment type, wellbore conditions, etc. The well sensor 102*b* may also be used to detect equipment at the well 108a-c, such as the well lubricator 114, the wireline tool 116a, and the surface equipment 120a, as well as activity involving the wells 108a-c.

The equipment sensor (and/or identifier) 102c may be positioned, on or about, the well equipment 112. The equipment sensor 102c may be any device capable of sensing and/or storing information about the well equipment 112 and/or its surroundings. For example, the equipment sensors 102c may be provided with gauges capable of measuring environmental conditions, such as temperature, humidity, etc. In another example, the equipment sensor 102c may be provided with an identifier, such as a bar code, RFID, serial number, etc., capable of providing equipment information about the well equipment 112. Such equipment information may be collected by the equipment monitor 104b as is described further herein.

The wireline sensor 102d may be positioned at various locations about the wireline tool 116a, the winch 127, and/or the wireline truck 125. The wireline sensor 102d may include internal and/or external sensors coupled to the wireline tool 116a for sensing and storing data concerning the wireline tool 116a and its surroundings. For example, the wireline sensor 102d may include gauges for collecting wireline parameters, such as downhole conditions, operation logs, time data, perforation data (e.g., time, number, and placement of charges), etc. Wireline sensors 102d may also be placed at the wireline truck 125 for capturing the wireline data.

The injection sensor 102e may be positioned at various locations about the injection tool 116b, the tubing 128b, and/or the injection truck 130. The injection sensor 102e may include internal and/or external sensors coupled to the injection tool 116b for sensing and storing injection data concerning the injection tool 116b and its surroundings. For example, the injection sensor 102e may include gauges for measuring injection parameters, such as downhole conditions, pumping pressures, fluid parameters, operation logs, time data, etc.

One or more wellsite monitors 104a-e may be positioned about the well pad 106 for collecting, storing, communicating, analyzing, and/or processing the data collected by the sensors 102a1-e. Each of the monitors 104a-e may include monitor communicators (e.g., transceivers, antennas, etc.) 121a capable of sending/receiving signals, databases (e.g., memory) 121b capable of storing data, processors (e.g., central processors, CPUs, etc.) 121c capable of processing the data, input/output (I/O) devices 121d (e.g., scanners, keyboards, touchscreens, monitors, printers, displays, etc.) capable of inputting data and generating outputs (e.g., displays, reports, alarms, etc.), computer readable medium 121e (e.g., software) capable of processing data and/or operating equipment, and other equipment. For simplicity, components 121a-e are only shown in FIG. 1B in the wellsite monitor 104a, but may be included in all of the monitors 104a-e. Part or all of the monitors 104a-e may be part of, or coupled to, the surface unit 117a, and provided with capabilities of operating equipment at the well pad 106.

The wellsite monitors 104a-e may include, for example, the wellsite monitor 104a, an equipment monitor 104b, a wireline monitor 104c, an injection monitor 104d, and an offsite monitor 104e. The wellsite monitor 104a may be positioned at various locations about the transporter 110 and/or the well pad 106 for collecting data from one or more of the sensors 102a1-e. For example, the wellsite monitor 104a may be coupled (wirelessly or by wire) by one or more of the communication links 132 to the various sensors 102a1-e.

In the example shown, the wellsite monitor 104a acts as a monitor for the wellsite trackers 102a1,a2. The wellsite monitor 104a is coupled to the wellsite tracker(s) 102a1,a2 to receive data therefrom. The wellsite tracker(s) 102a1,a2 may send signals at intervals (e.g., ping every 30 seconds) to the wellsite monitor 104a to identify any changes in location. The wellsite monitor 104a may receive and process the data from the sensors 102a1,a2 and generate information about the transporter 110, such three-axis location, transporter identification, time at location, distance traveled, location versus time, etc. The wellsite monitor 104a may also be coupled to other sensors 102b-e about the wellsite 100 for collecting other parameters therefrom. The wellsite monitor 104a may also generate outputs, such as transportation logs, equipment schedules, maps to destinations, etc., as described further herein.

The wellsite monitor 104a may also be coupled (wirelessly or by wire) to the well sensor(s) 102b for collecting data from the well sensor(s) 102b. The wellsite monitor 104a may be used for collecting, communicating, analyzing, generating, and/or otherwise processing data received from the well sensors 102b. For example, the wellsite monitor 104a may generate well parameters about the wells 108a-c, such well identification, equipment identification, crew identification, well location, operating parameters, etc. The equipment monitor 104b may also generate outputs, such as job logs, equipment schedules, crew assignments, maintenance needs, etc.

The wellsite monitor 104a may be part of, or coupled to, the surface unit 117a. The wellsite monitor 104a may be a separate unit that works as a stand-alone system, or as an integral part of the surface unit 117a. The wellsite monitor 104a may also be integrated with, or coupled to, an offsite unit 117b located a distance from the well pad 106. The surface unit 117a and/or the offsite unit 117b may include or be coupled to libraries 121b with data from various sources, such as offsite data (offsite parameters) generated from the wells 108a-c, client data, historical data, etc. The offsite unit 117b may also have additional resources, such as personnel, computer systems, etc.

The equipment monitor 104b may be positioned about the tool storage 118 or a distance therefrom. The equipment monitor 104b may be used for collecting, communicating, analyzing, generating, and/or otherwise processing data received from the equipment sensors 102c. For example, the equipment monitor 104b may scan the equipment sensor (or equipment identifier) 102c to generate equipment parameters about the well equipment 112, such serial numbers, model numbers, etc. The input/output device 121d of the equipment monitor 104b may include a scanner (e.g., stationary or mobile scanner, scanning gun, etc.) for scanning the equipment sensor 102c and/or entering information about the well equipment 112. The equipment monitor 104b may also generate outputs, such as equipment schedules, equipment logs, client specs, etc.

A wireline monitor 104c may be positioned about the well pad 106, for example, in the well truck 125. The wireline monitor 104c may be coupled to the wireline tool 116a and/or the wireline sensors 102d wirelessly, via the wireline 128a, and/or via the communication link 132 for communication therewith. The wireline monitor 104c may be used for collecting, communicating, analyzing, generating, and/or otherwise processing data received from the wireline sensors 102d and/or the wireline tool 116a. For example, the wireline monitor 104c may generate wireline parameters about the wireline tool 116a, such serial numbers, model numbers, downhole measurements, wellbore conditions, job time, etc.

The wireline monitor 104c may also generate outputs, such as job logs, perforation timing, number and location of perforations, etc.

The injection monitor 104d may be positioned about the well pad 106, for example, in the injection truck(s) 130. The injection monitor 104d may be coupled to the injection tool 116b and/or the injection sensors 102e wirelessly or via the tubing 128b for communication therewith. The injection monitor 104d may be used for collecting, communicating, analyzing, generating, and/or otherwise processing data received from the injection sensors 102e and/or the injection tool 116b. For example, the injection monitor 104d may generate injection parameters about the injection tool 116b, such serial numbers, model numbers, downhole measurements, wellbore conditions, job time, fluid pressure, etc. The injection monitor 104d may also generate outputs, such as job logs, perforation timing, pump cycles, etc.

The offsite monitor 104e may be positioned at the offsite unit 117b. The offsite monitor 104e may be coupled to one or more of the monitors 104a-e to collect data therefrom. The offsite monitor 104e may also be coupled to other sources to receive data therefrom. For example, the offsite monitor 104e may be coupled to or contain libraries 121b with additional data. In another example, the offsite monitor 104e may generate injection parameters about the wellsite 100, customers, the company operating the wellsite 100, historical data, etc. The offsite monitor 104e may also generate outputs, such as schedules, reports, comparisons, alarms, etc. The offsite monitor 104e may also send data and outputs to the other monitors 104a-d.

While FIGS. 1A and 1B show an example layout for the wellsite 100 and/or the wellsite monitoring system 101, variations are within the scope of this disclosure. For example, the wellsite in these examples is shown with specific equipment positioned about the wellsite 100 including the transporter 110, the storage 118, the well equipment 112, the surface equipment 120a-c, the downhole tools 116a-b, the winch 127, the wireline truck 125, the injection trucks 130, etc. Other wellsite equipment, such as other downhole tools, other surface equipment, other monitoring equipment (e.g., cameras), may also be provided. In another example, while three production wells 108a-c are shown positioned about the well pad 106, any number of various types of wells, wellbores, and associated equipment may be provided. Additionally, the wellsite monitoring system 101 may include one or more of the sensors 102a1-e, the monitors 104a-e, the communication links 132, and/or one or more of the surface/offsite units 117a,b, as well as other sensors, monitors, and units, at various locations. One or more of the sensors 102a1-e may optionally also be provided with an internal and/or attached monitor. The monitoring system 101 may collect various parameters, such as transporter, tool, well, equipment, wireline, injection, offsite, and other parameters.

Figure 2:
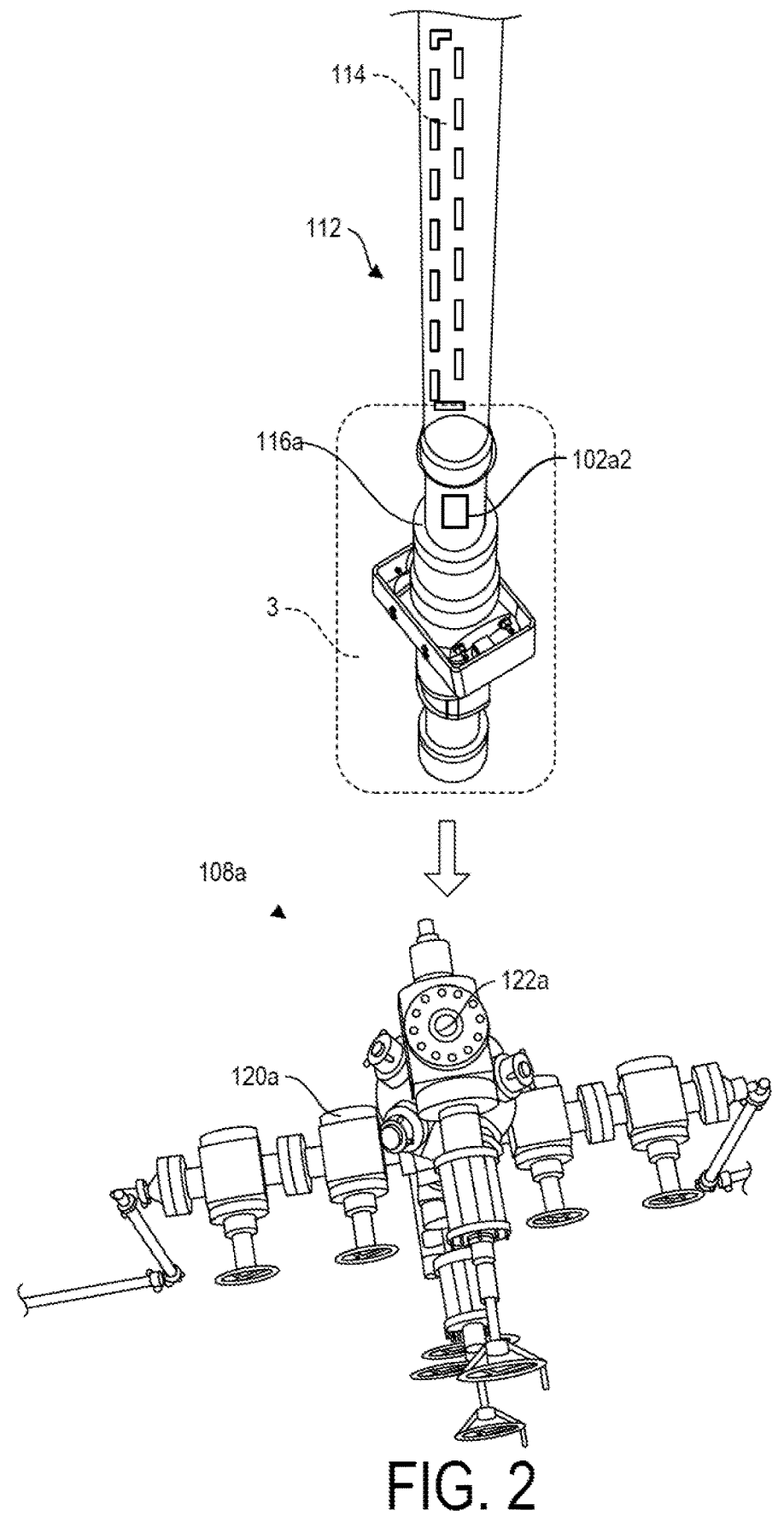
FIGS. 2 and 3 are schematic diagrams showing side and detailed views of a wellsite tracker positioned on well equipment.
Figure 3:
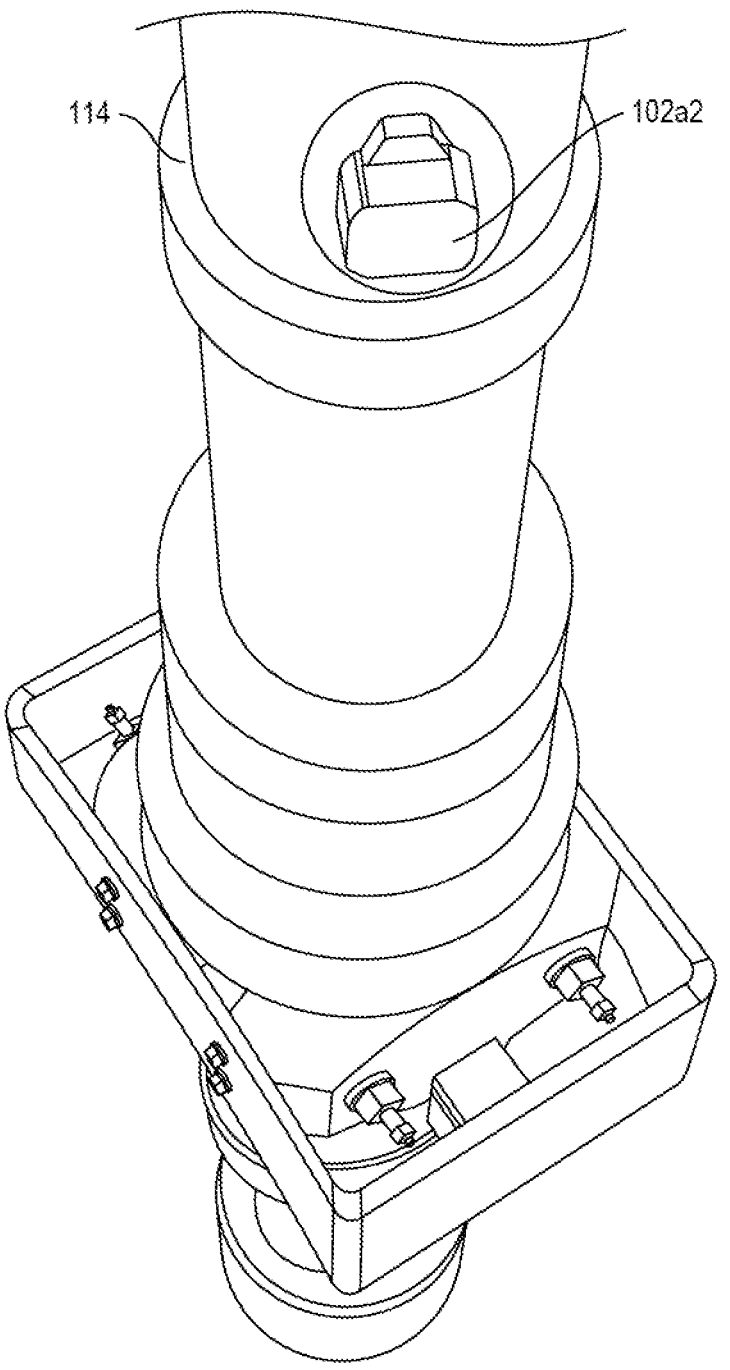

FIGS. 2 and 3 are schematic diagrams showing side and detailed views of a wellsite tracker 102a2 positioned on the well equipment 112. FIG. 2 shows a side view of the well equipment 112 carried by the transporter 110 (FIG. 1A), and positioned over the well 108a for insertion into the surface equipment 120a. The well lubricator 114 may then be lowered by the transporter 110 for connection to the surface equipment 120a, and activated to release the wireline tool 116a through the surface equipment 120a and into the wellbore 122a.

FIG. 3 shows a portion 3 of the well equipment 112 of FIG. 2. This view shows the wellsite tracker 102a2 in greater detail. As shown in FIG. 3, the wellsite tracker 102a2 may be positioned on an outer surface of the well lubricator 114. The wellsite tracker 102a2 in this example is positioned to collect data (e.g., tracker parameters) about the well equipment 112, such as location and time of the well equipment 112, as it is moved by the transporter 110 (FIG. 1A). The wellsite tracker 102a2 may be pre-programmed using the wellsite monitor 104a (FIG. 1B) to set an initial location, and to detect changes as the wellsite tracker 102a2 is moved. Once the wellsite tracker 102a2 is positioned at the well 108a, the wellsite tracker 102a2 may also provide a location of the well 108a. The position of the wellsite tracker 102a2 may be gathered at time intervals. This and other information may be used by the wellsite monitor 104a (FIG. 1) to generate outputs as is described further herein.

FIGS. 4A-4D are schematic diagrams depicting various views of the wellsite tracker 102a. This wellsite tracker 102a may be used as the wellsite trackers 102a1, a2 and/or the sensors 102b-e of FIGS. 1A and 1B for use about any of the wellsite equipment. The wellsite tracker 102a may be provided with a portable, compact, detachable, disposable, mobile, and replaceable configuration.

As shown in these figures, the wellsite tracker 102a may have a tracker housing 440 positionable on the well equipment 112 (and other equipment). The tracker housing 440 is shown as a rectangular (or cuboid) box, but may be any shape. The tracker housing 440 may have extra thickness and be made of a heavy-duty material (e.g., hard plastic, rubber, and/or metal) capable of protecting the wellsite tracker 102a during use in harsh conditions. The tracker housing 440 may be a non-conductive or other material that will not interfere with an electronic signal, such as a hard plastic, explosion resistant, and waterproof material. The tracker housing 440 may also have openings and/or covers for a communication antenna 442a to allow for wireless communication with other components, such as the monitors 104a-e (FIGS. 1A and 1B), and a location antenna 442b to communicate with the satellites 134.

Figure 4A:
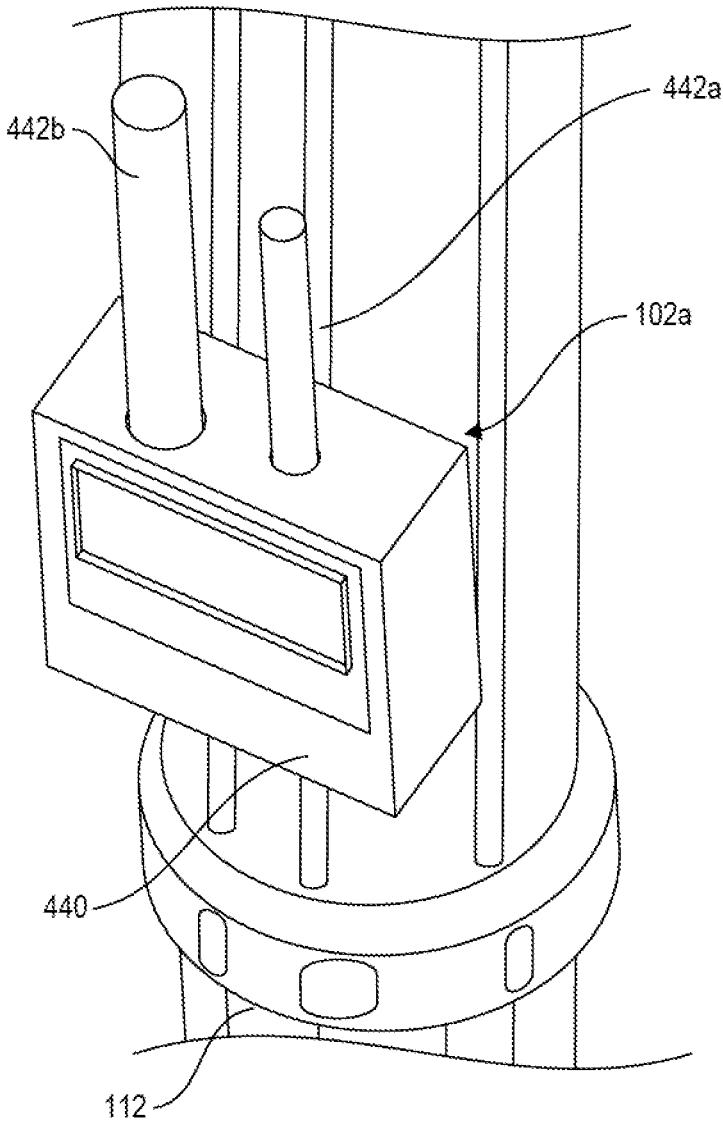
FIGS. 4A-4D are schematic diagrams depicting various views of the wellsite tracker.
Figure 4B:
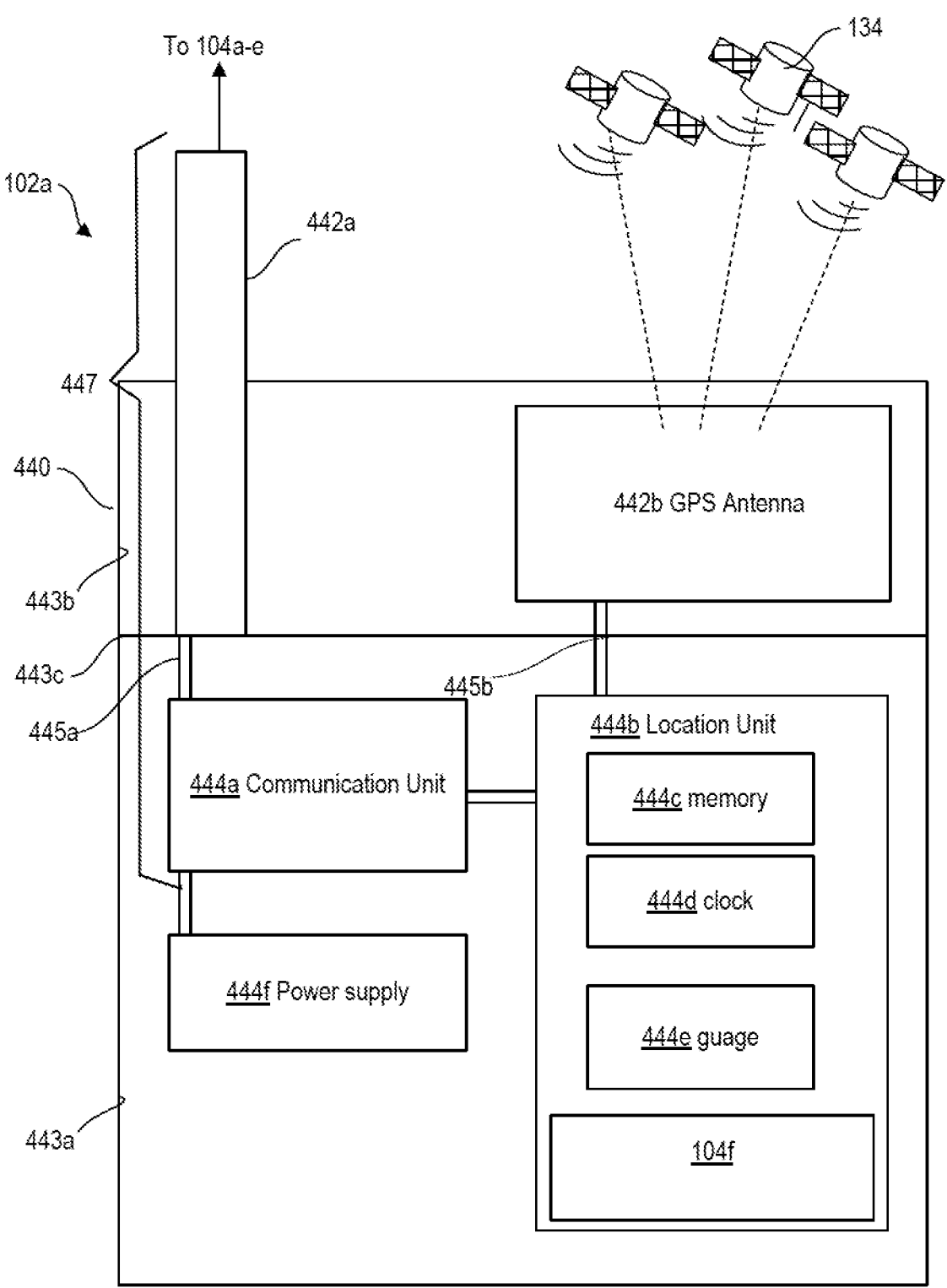

FIG. 4B shows the tracker housing 440 with components of the wellsite tracker 102a housed therein. As shown in this example, the wellsite tracker housing 440 has two chambers, namely a component chamber 443a and an antenna chamber 443b. The antenna chamber 443b may be isolated from the component chamber 443a by a barrier 443c, such as a metallic plate divider. The barrier 443c may act as a ground for the antennas 442a,b and to reduce signal noise.

The antenna chamber 443b may house and protect the antennas 442a,b. The location antenna 442b may be positioned in the antenna chamber 443b and extend through an opening in the housing for communication with components outside of the tracker housing 440. The communication antenna 442a may be any antenna capable of providing communication between a communication unit 444a and one or more of the wellsite monitors 104a-e. For example, the communication antenna 442a may be a radio antenna, such as U.FL IPEX to SMA Connector Pigtail 915 MHz LoRa Antenna 2 dBi. The communication antenna 442a may also be capable of communication with various wellsite equipment, such as valves on the surface equipment 120a-c, for performing wellsite operations. The location antenna 442b may be positioned in the antenna chamber 443b and attached to a conductive (e.g., metal) surface, such as the metal barrier 443c. The location antenna 442b may be a GPS wirelessly coupled to three satellites 134 to receive location data, such as three-axis location coordinates therefrom.

As also shown in FIG. 4B, the component chamber 443a may house and protect the components of the wellsite tracker 102a2. The components of the wellsite tracker 102a2 in this example include the communication unit 444a, a location unit 444b, a memory 444c, a clock 444d, a gauge 444e, and a power supply 444f. Cables 445a,b are provided for connection between the components.

The communication unit 444a may be any device capable of sending and receiving communications to/from the wellsite tracker 102a, such as a transceiver. The communication unit 444a may be, for example, a radio chip, such as a LoRa/LoRaWAN Development Board commercially available from GRASSHOPPER™ at https://www.tindie.com/ products/tleracorp/grasshopper-loralorawan-development-board/. The communication unit 444a may be connected by a micro-USB-B (Universal Serial Bus-type B) cable 445a to the communication antenna 442a. The antenna 442a and the communication unit 444a may form a tracker communicator 447 capable of sending and receiving signals to various wellsite equipment, such as the wellsite monitor(s) 104a-e, the surface equipment 120a-c, etc.

The location unit 444b may be any device capable of detecting a location, such as a GPS processing device (e.g., processor or microprocessor) capable of collecting and receiving location data from the location antenna 442b. The location unit 444b may be, for example, a ZED-F9P (Qwiic) available from SPARKFUN™ at www.sparkfun.com. The location unit 444b may be connected by the cable 445b to a location antenna 442b in the antenna chamber 443b. The location unit 444b may have processing capabilities for receiving the location data from the location antenna 442b and for receiving time data from the clock 444d over time. The location unit 444b may receive the location data and the time data, and to generate tracking data, such as an inferred spatial location (e.g., position (X and Y) and height (Z)) of the wellsite tracker 102a at any given time. The location, time, and tracking data may be stored in the memory 444c.

The wellsite tracker 102a may also be provided with other devices, such as the gauge 444e. The communication unit 444a and/or the location unit 444b may also be provided with or coupled to other components within the tracker housing 440. As shown in FIG. 4B, the location unit 444b also includes the memory 444c, the clock 444d, and the gauge 444e therein. The memory 444c may be any device capable of storing data received by the wellsite tracker 102a2, such as the internal memory of a microprocessor or a SDS card or other database within the radio chip or other part of the location unit 444b. The clock 444d may be any device used to measure time, such as the clock that comes with the microprocessor within the radio chip or in another part of the location unit 444b. This time may be used to identify time when events occur during operations and provide location versus time as is described further herein. The gauge 444e may be any device capable of measuring any desired any parameter, such as a temperature (thermometer), pressure (pressure gauge), orientation and movement (accelerometer), etc.

The communication unit 444a and/or the location unit 444b are coupled to the power supply 444f (e.g., by cables). The power supply 444f may be a battery or other power source positionable about the tracker housing 440 for providing power to the components of the wellsite tracker 102a. The power supply may be, for example, 3 AA batteries with a support, or other source capable of generating from about 4.5 to about 5.1 volts, about 0.4 max amps, and about 0.02 watts on average.

As also shown in FIG. 4B, the wellsite tracker 102a2 may be provided with a tracker monitor 104f. The tracker monitor 104f as shown is positioned within the location unit 444b, but could be separate therefrom. The tracker monitor 104f may be positioned in the component chamber 443a or external to the housing 440. The tracker monitor 104f may be coupled to or part of one or more of the other monitors 104a-e. The tracker monitor 104f may have similar features and/or operate similarly to the wellsite monitor 104a.

The tracker monitor 104f may be capable of collecting information from the location antenna 442b concerning the coordinate location of the wellsite tracker 102a. This information may be processed by the wellsite monitor 104f to process and/or generate information concerning the wellsite 100. The collected information may be communicated to one or more other wellsite monitors 104a-e. The wellsite equipment may have communication devices, such as antennas capable of receiving information from the communication antenna 442a. The collected information may also be used to send a signal to the wellsite equipment via the communication antenna 442a, thereby activating the wellsite equipment as is described further herein.

Figure 4C:
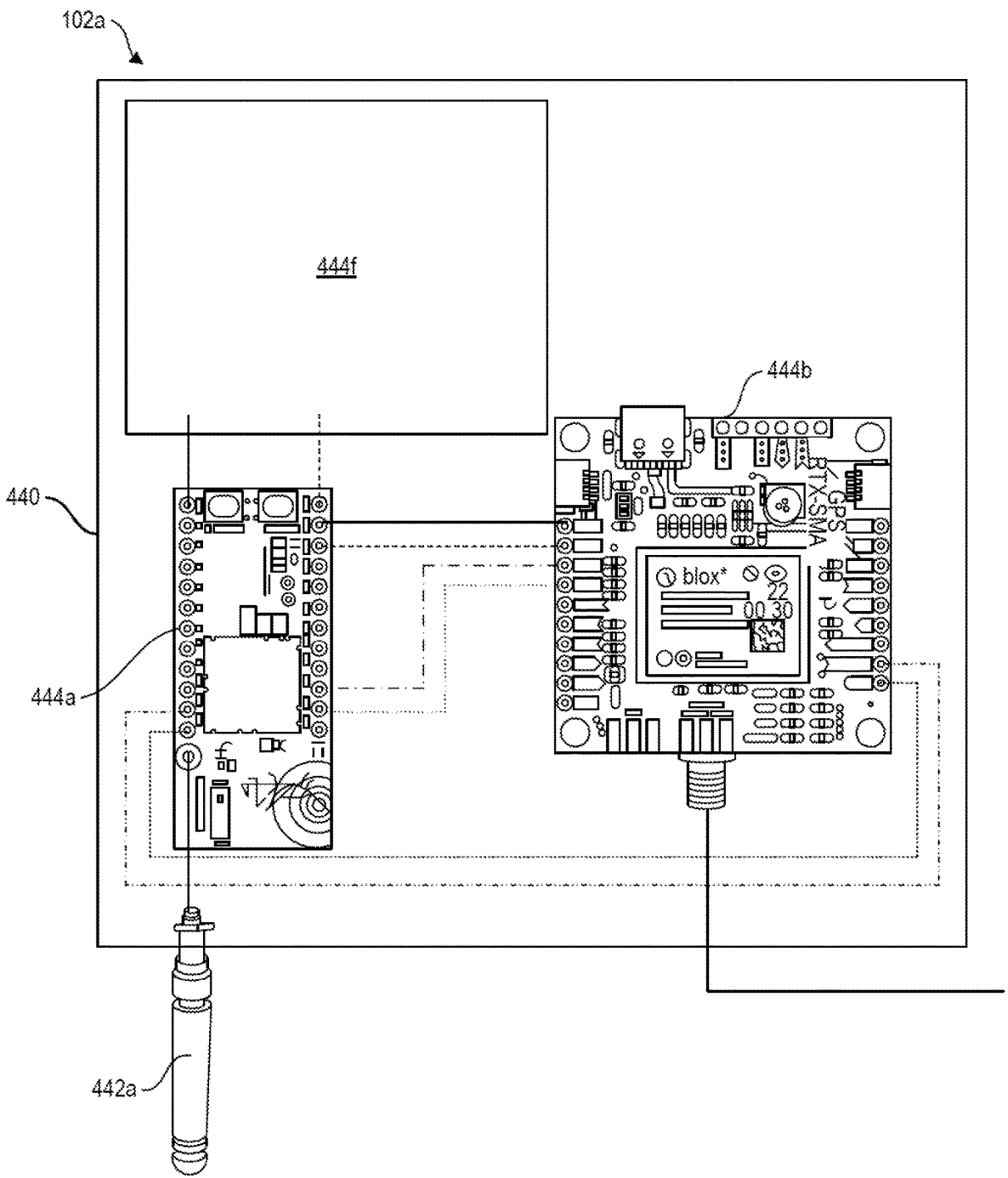
Figure 4D:
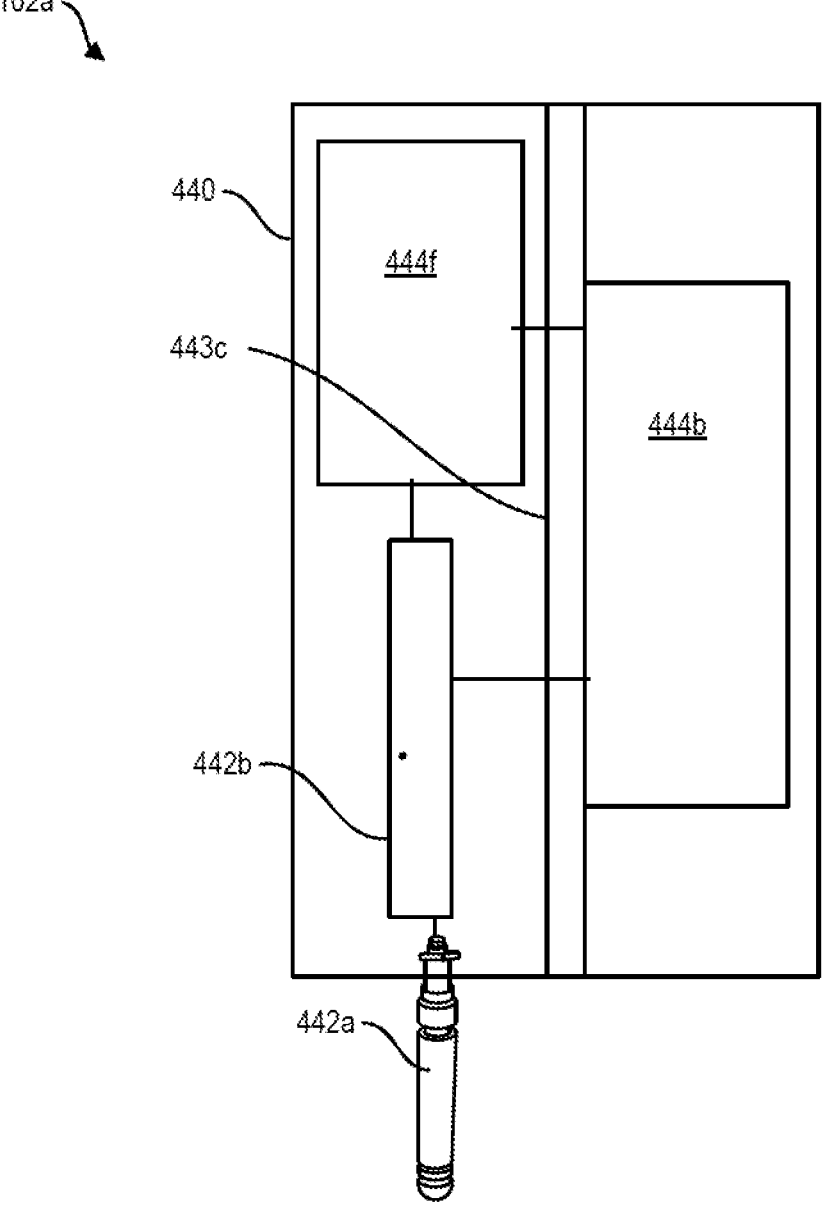

FIGS. 4C and 4D show additional views of the wellsite tracker 102a. These views show front and side layouts of the components in the tracker housing 440. These views also show example configurations for the communication unit 444a, the location unit 444b, and the power supply 444f. As shown in these views, the communication unit 444a is coupled to the power supply 444f for receiving power therefrom. The communication unit 444a is coupled to the location unit 444b by power connections for passing power from the power supply 444f via the communication unit 444a to the location unit 444b. The communication unit 444a is coupled to the location unit 444b by data connections for passing data therebetween.

Figure 5:
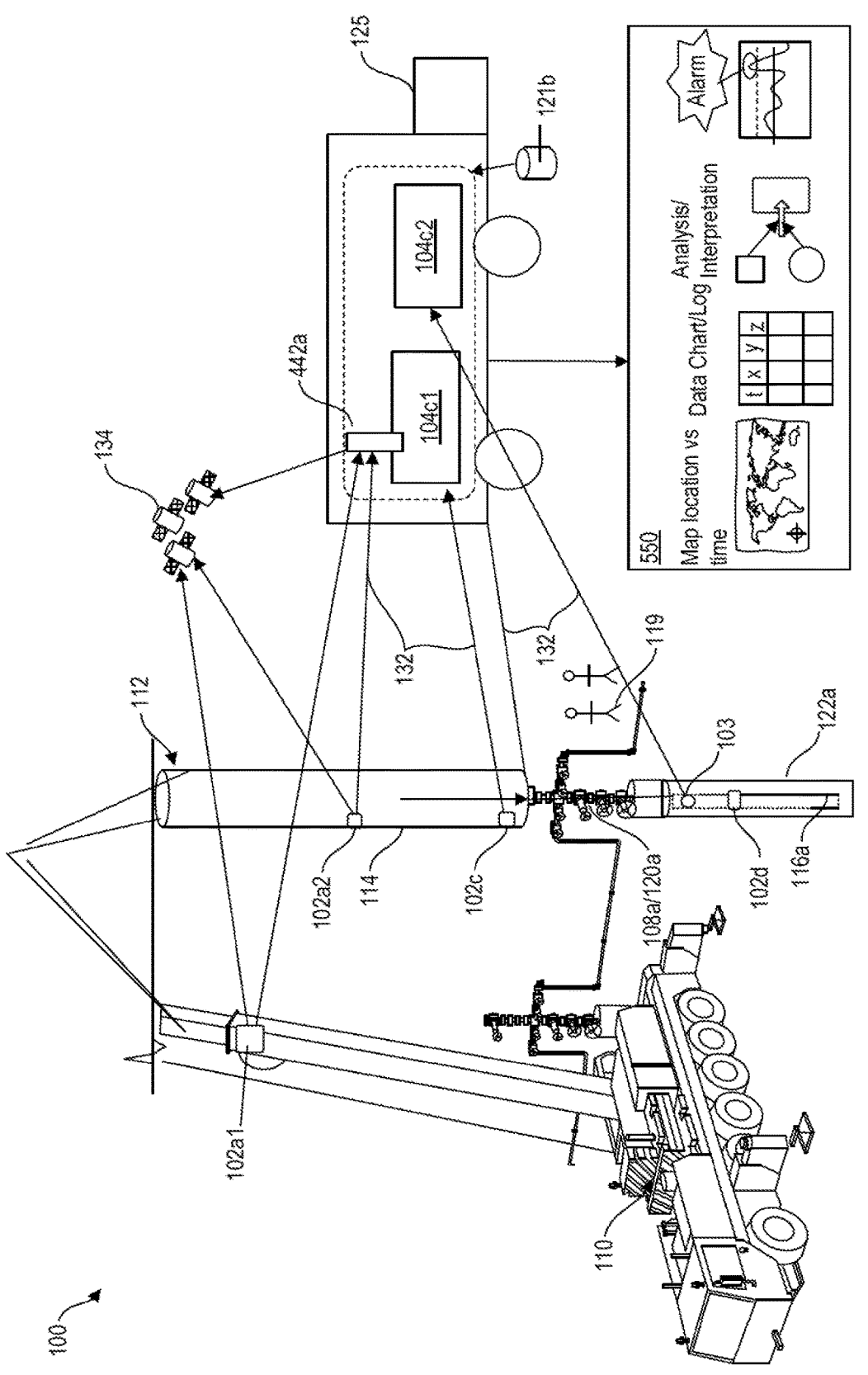
FIG. 5 is a schematic diagram depicting the wellsite monitoring system performing a wellsite tracking operation.

FIG. 5 is a schematic diagram depicting the wellsite monitoring system performing a wellsite tracking operation. For simplicity, only a portion of the wellsite 100 is shown. Other wellsite equipment can be provided as shown in FIGS. 1A and 1B. In this example, the wellsite trackers 102a1,a2 are positioned about the transporter 110 and the well equipment 112, and in communication with a wireline truck 125. This view shows an example location operation for capturing location parameters using the wellsite trackers 102a1,a2 and sending the location parameters to the monitor 104c1 in the wireline truck 125. As demonstrated in this example, the wireline monitor 104c1 may be used to as the monitor for collecting parameters from the wellsite trackers 102a1,a2 and other sensors 102d, 103, etc.

The wellsite trackers 102a1,a2 collect location data (X,Y, Z) at recorded times (t) during the wellsite operations. As the transporter 110 moves and the well equipment 112 deploys the downhole tool 116a into the wellbore 122a at well 108b, the location unit 444b (FIG. 4B) collects the location and time data and sends it via the communication unit 444a (FIG. 4B) from the well tracker 102a1,a2 to the monitor 104c. The location parameters may be captured, stored, and processed within the wellsite tracker 102a1,a2 and/or within the monitor 104cl. The collected data and/or the location parameters may be further processed by the wellsite trackers 102a1,a2 and/or by the monitors 104c1,c2 to provide outputs 550, such as maps, charts, reports, analysis, alarms, etc., as schematically shown. As also schematically shown, the outputs 550 may include an alarm to alert when any parameter is outside predetermined specifications.

In an example tracking operation, wellsite trackers 102a1, a2 perceive and track position versus time of the attached wellsite tracker 102a1,a2 or well equipment 112 as it moves to the well 108b where services are delivered. The wellsite trackers 102a1,a2 then communicate data files to the monitor 104a in wireline truck 125. The wellsite trackers 102a1, a2 may use the tracker monitor 104f (FIG. 4B) for preprocessing and pre-analyzing the collected location parameters. The wireline monitor 104c1 in the wireline truck 125 may perform further analysis and computation on these collected location parameters as needed. The analysis and computation may employ methods for processing data for further use in other applications for the internet of things (IOT).

As further shown in FIG. 5, the wireline truck 125 may have one or more monitors 104c1,c2 for processing various information received from multiple sources. The monitors 104c1,c2 may be separate as shown, or combined to process multiple parameters from multiple sensors about the wellsite 100. The monitors 104c1,c2 may be coupled to various sensors 102a1-e via the communication links 132 for receiving the data therefrom. The wireline truck 125 may also be provided with other features, such as the communication antenna 442a to facilitate communication with the trackers 102a1,a2. For example, where the monitor 104c1 is a computer, the antenna 442a may be connected by a Universal Serial Bus (USB) port for communication with the well trackers 102a1,a2.

The monitor 104c2 may also be, a wireline monitor for receiving data from the wireline sensor 103 in the wireline tool 116a and from other sources, such as a library 121b or other data source. The wireline sensor 103 may capture wireline parameters, such as tool events (e.g., perforations), time downhole, downhole conditions (e.g., depth, temperature), equipment parameters (e.g., tool identification), well parameters (e.g., well identification), etc. The wireline parameters may be analyzed separately to provide outputs, such as wireline logs, job schedules, etc. The wireline parameters may also be combined with the location parameters to provide combined parameters, such as wireline operation time, crew activity, confirmation of proper equipment at assigned well, etc. The monitors 104c1,c2 may then work independently or in combination to generate the outputs 550.

In an example, the tracker monitor 104f may be used to determine if a certain condition exists based on collected data or receive commands from another wellsite monitor 104a-e. The wellsite monitor 104a-e may then activate the wellsite trackers 102a1,a2 to send a signal via its communication antenna 442a (FIG. 4B) to certain wellsite equipment. Once in communication with the wellsite equipment, the well tracker 102a and/or the tracker monitor 104f may be used to activate the wellsite equipment. For example, the communication antenna 442a may send a trigger signal to wellhead valves in the surface equipment 120a-c causing the valves to open or close. This may also allow for remote lock-out of the valves on the surface equipment. Such auto lock-out may be performed manually or automatically based on information, such as wireline depth, gathered from the wireline tool 116a. Such information may be used, for example, to generate alarms and/or to communicate with the wellsite equipment to prevent accidental closing of valves before the wireline tool 116a is at the surface.

Figures 6A, 6B:
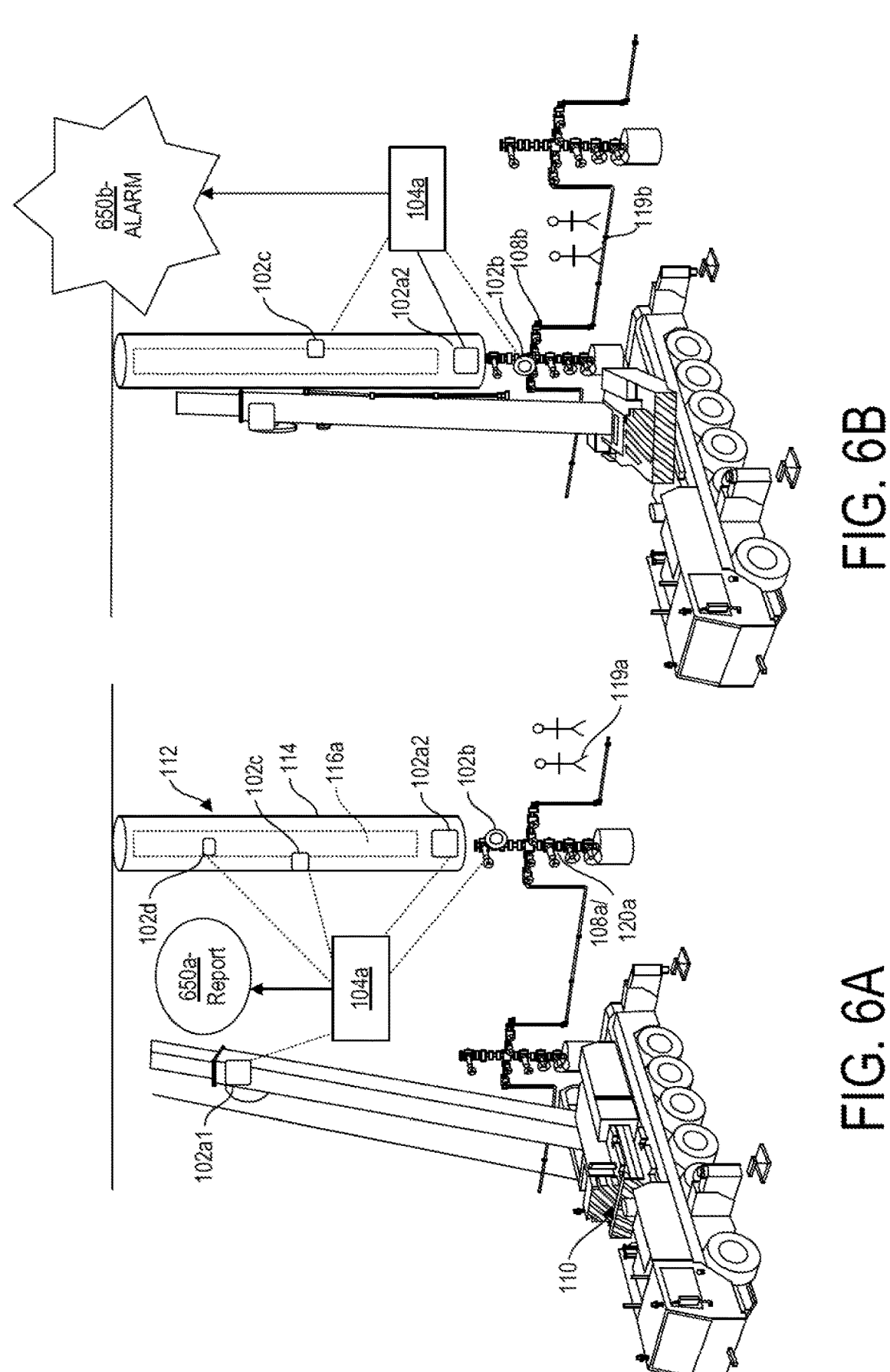
FIGS. 6A and 6B are schematic diagrams depicting the wellsite monitoring system performing the wellsite tracking operation to confirm wellsite operations.

FIGS. 6A and 6B are schematic diagrams depicting the wellsite monitoring system performing the wellsite tracking operation to confirm wellsite operations. The wellsite monitoring system 101 is shown at well 108a in FIG. 6A and at well 108b in FIG. 6B. As shown in these figures, the transporter 110 is used to transport the well equipment 112 to the wells 108a,b. The transporter 110 has the wellsite tracker 102a1 positioned on the transporter 110 and the wellsite tracker 102a2 positioned on the well equipment 112. The transporter 110 has moved the well equipment 112 to the wells 108a,b for installation. The crews 119a,b are positioned at the wells 108a,b to facilitate installation of the well equipment 112 at the wells 108a,b. The wellsite monitoring system 101 is used to capture various tracking parameters during the wellsite tracking operations.

In this example, the wellsite trackers 102a1, a2 are used to capture location data, such as the GPS location, environmental parameters, time, etc. The wellsite trackers 102a1,a2 may collect the same data or different data. The sensors 102b-e may also be used to collect data about the wells 108a,b. The equipment sensor 102c may capture equipment data, such as the equipment identification of the well equipment 112. The well sensor 102b may collect well data, such as such as when the well lubricator 114 is positioned on the surface equipment 120a and when the wireline tool 116a is deployed therethrough. The wireline sensor 102d may collect downhole data, such as wireline measurements, time when shape charges are launched by the wireline tool 116a, and location where the shaped charges fired to create perforations.

The wellsite monitoring system 101 may use the wellsite monitor 104a to gather the data from the various sensors 102a1-e. The wellsite monitor 104a may combine the data from the wellsite tracker(s) 102a1, a2 and the various sensors 102b-e to generate various outputs 650a,b, such as a display of the raw data from the wellsite trackers 102a1,a2 and the sensors 102b-d for review by the crews 119a,b. The wellsite monitor 104a may also process the data to generate an analysis of the data, such as a comparison of the collected data against pre-determined specifications, and then issue the report 650a. Data that falls outside of predetermined range of the specifications may trigger outputs, such as the alarm 650b. The wellsite monitor 104a may also be used to generate other outputs, such as time alerts for delays detected by monitoring time the well equipment 112 is in any position and/or performing any detected operation.

In the example location operation, when the transporter 110 carries the well equipment 112 to the well 108a of FIG. 6A, the wellsite monitor 104a receives location data from the wellsite tracker 102a2 concerning the three-axis location of the well equipment 112, and determines that the well equipment 112 is positioned at well 108a. The equipment sensor 102c indicates that a given type of well lubricator 114 and wireline tool 116a are positioned at the well 108a. The well 108a indicates when the well equipment 112 engages the surface equipment 120a.

The wellsite monitor 104a may compare the data collected by the wellsite tracker 102a2, the equipment sensor 102c, and/or the well sensor 102b with predetermine specifications to confirm the correct wireline tool 116a is positioned at the correct well 108a. The wellsite monitor 104a may also include information about the crew 119a to confirm the identity of the personnel working at the well 108a. By comparing the collected data with the predetermined specifications (e.g., job schedules), the wellsite monitor 104a may confirm the wellsite tracking operation meets specifications. For example, operational values, such as location, well identification, crew identification, etc., can be compared directly with specified values to confirm a match within a predetermined range.

Based on the comparison, the wellsite monitor 104a has the capability of checking the data of the various parameters against the specifications, and confirming the well equipment 112 is positioned at the correct well 108a with the correct crew 119a. Other parameters may also be analyzed and confirmed to assure the wellsite operations are set up properly prior to performance. Once the set up is confirmed to be correct, the wellsite monitor 104a may generate a positive report 650a as shown in FIG. 6A.

As shown in FIG. 6B, the wellsite monitor 104a uses the same process to analyze the parameters and confirm the wellsite operations. In this case, the wellsite monitor 104a compares the data and determines that the parameters fail to meet the specifications and the well equipment 112 is positioned at the wrong well 108b. Once the set up is confirmed to be incorrect, the wellsite monitor 104a sounds an alarm 650b requiring correction. The wellsite monitor 104a may also monitor the various parameters over time to detect other out of specification conditions, such as delays, equipment failures, etc., and generate outputs 650a,b based on such conditions.

As demonstrated by FIGS. 6A and 6B, the analysis of the location alone and/or with other well parameters may be used to determine efficiencies of operation. The generated outputs may be used to optimize logistics by monitoring operations, detecting accidents, identifying crew and equipment, determining the time to perform operations, detecting expected duration, and determining inefficiencies. Performance and efficiency may be inferred based on the reported time versus position.

The outputs 650a,b may also be fed back into the wellsite monitor 104a. The wellsite monitor 104a may send communication signals based on the outputs 650a,b to certain wellsite equipment. The wellsite monitor 104a may send the communication signals via the communication antenna 442a of the wellsite tracker 102a1,a2 to the wellsite equipment. The wellsite monitor 104a may thereby control operation of the wellsite equipment. In the alarmed example shown in FIG. 6B, the wellsite monitor 104a may use the wellsite tracker 102a1 to send a signal causing the valve in the surface equipment 120a to lock, thereby preventing deployment of the wireline tool 116a into the wrong well 108b.

Figure 7:
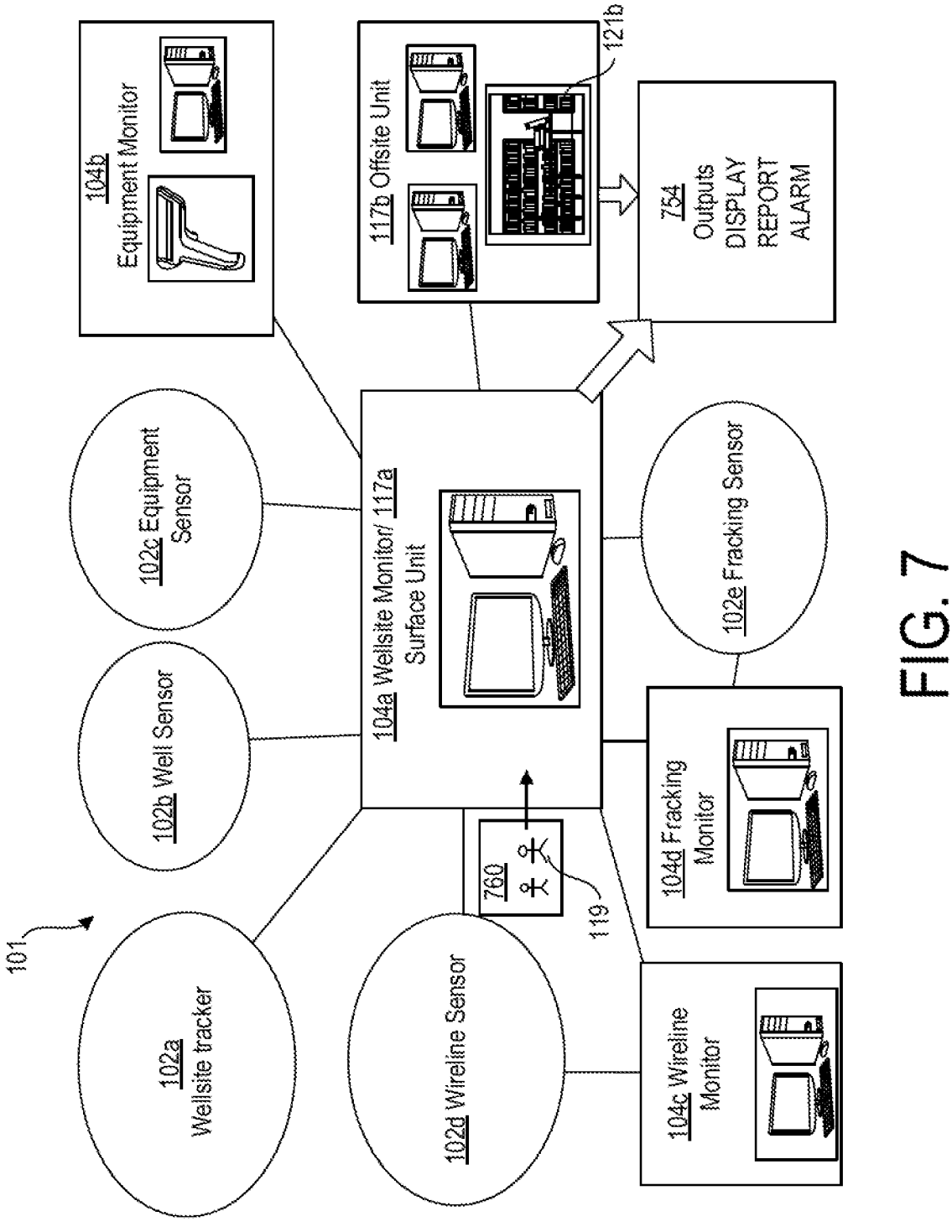
FIG. 7 is a schematic diagram of the wellsite monitoring system performing multiple wellsite operations.

FIG. 7 is a schematic diagram of the wellsite monitoring system 101 for performing multiple wellsite operations. As shown in this view, multiple sensors 102a1-e and wellsite monitors 104a-e may be used to integrate captured data and analyze wellsite operations. As also shown in this view, the wellsite monitors 104a-e may be independent components, or combined with one or more other monitors, the surface unit 117a, and/or the offsite unit 117b. For example, while not shown, the wellsite monitor 104a may optionally be part of or coupled to another monitor, such as the wireline monitor 104c located in the wireline truck 125 (FIG. 1B).

In the example in FIG. 7, the various sensors 102a1-e and the wellsite monitors 104a-e are interconnected by the communication links 132 to allow cross communication therebetween. The data from the various sensors 102a1-e may be combined within one or more of the wellsite monitors 104a-e to generate various outputs 754. One or more of the wellsite monitors 104a-e may be used to manipulate the data collected by one or more of the various sensors 102a1-e and/or one or more external sources, such as one or more onsite and/or offsite libraries 121b, as well as information that may be input 760 by crews 119 at one or more of the monitors 104a-e. The combination of sources provides the ability to combine location data from the wellsite trackers 102a1,a2 with other data. The various data may be combined and analyzed across multiple sources to provide the ability to analyze various combinations of information about various wellsite operations.

The combined data may be also used to generate location-based information. For example, the wellsite monitoring system 101 may be used to generate location-based outputs based on a combination of data from the wellsite trackers 102a1,a2 and/or the sensors 102b-e with data from the libraries 121b of the surface unit 117a and/or the offsite unit 117b. One or more of the wellsite monitor(s) 104a-e may combine the location data with the various data to generate the location-based outputs. The locations generated over time by the wellsite trackers 102a1,a2 can be combined with wireline data and fracking data to assure proper placement of equipment and to determine delays in operations. This location detection may also identify missing, lost, and/or stolen equipment to assure security of equipment use and placement, as well as identifying unusual operational events and/or costly delays.

FIG. 8 is a flow chart depicting a method 800 of monitoring wellsite operations. The method 800 involves location detection 800a and location analysis 800b. The location detection 800a involves (860) attaching well equipment (e.g., lubricator and wireline tool) to a transporter (e.g., crane), (861) positioning a wellsite tracker about the wellsite equipment (e.g., the transporter and/or the well equipment), (862) positioning the well equipment about a well, (863) using the wellsite tracker, receiving location data comprising a position (e.g., 3d coordinates from satellites) over time of the well equipment, (864) using the wellsite tracker, inferring tracking data (e.g., spatial location and time) for the wellsite equipment from the location data and the time, (865) comparing the tracking data with predetermined specifications, and (866) generating outputs based on the tracking data (e.g., displays, reports, alarms). The comparing (865) may involve confirming wellsite operations by comparing the tracking data for the wellsite equipment with predetermined specifications.

The location analysis 800b may involve an integrated analysis of various combinations of part or all of the wellsite. The location analysis 800b involves (867) collecting wellsite data about the wellsite, the wellsite data comprising equipment data for the equipment (e.g., scan/input equipment id), well data of the well (e.g., well id, surface equipment), downhole data (e.g., wireline measurements), surface data (e.g., pump measurements), (868) generating integrated wellsite parameters based on the integrated location data (e.g., duration of surface and downhole operations, events, location at each event, etc.), (869) comparing the integrated wellsite parameters with predefined wellsite specifications, (870) generating outputs based on the integrated wellsite parameters, (871) adjusting wellsite operations based on the integrated wellsite parameters, and (872) activating the wellsite equipment based on the wellsite data and/or the integrated parameters. The location analysis may be performed, for example, using the wellsite monitor(s) described herein.

The method 800 may also involve variations or other actions, such as: generating an alarm when the tracking data is outside of a predetermined range of the predetermined specifications, collecting wellsite data from sensors positioned about the wellsite, activating the wellsite equipment by generating an activation signal based on the tracking data and sending the activation signal to the wellsite equipment, activating the wellsite equipment by opening/closing a valve at a wellhead and wherein the activation signal comprises a command to open/close the valve.

Part or all of the method may be performed in any order, or as needed. Part or all of the methods herein may be performed using hardware (e.g., processors), software (e.g., computer readable medium (transitory or non-transitory)), and or the monitors described herein.

As used herein, "computer readable medium" or "machine-readable storage medium" may include a storage drive (e.g., a hard drive), flash memory, Random Access Memory (RAM), any type of storage disc (e.g., a Compact Disc Read Only Memory (CD-ROM), any other type of compact disc, a DVD, etc.) and the like, or a combination thereof. In some examples, a storage medium may correspond to memory including a volatile (main) memory, such as RAM, where software may reside during runtime, and a secondary memory. The secondary memory can, for example, include a non-volatile memory where a copy of software or other data is stored.

As provided above, examples in the present disclosure may also be directed to a non-transitory computer-readable medium storing computer-executable instructions and executable by one or more processors via which the computer-readable medium is accessed. A computer-readable media may be any available media that may be accessed by a computer. By way of example, such computer-readable media may include random access memory (RAM), read-only memory (ROM), electrically erasable programmable read-only memory (EEPROM), compact disk read-only memory (CD-ROM) or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Note also that the software implemented aspects of the subject matter claimed below are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The claimed subject matter is not limited by these aspects of any given implementation.

Furthermore, examples disclosed herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top", "bottom", "anterior" and "posterior" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features and/or methods provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter. For example, while certain tools and components (e.g., assemblies) are provided herein, it will be appreciated that various configurations (e.g., shape, order, orientation, etc.) of such tools and/or components may be used. While the figures herein depict a specific configuration or orientation, these may vary. First and second are not intended to limit the number or order.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

What is claimed is:

1. A wellsite tracker for tracking wellsite equipment at a wellsite, the wellsite tracker comprising:
   a tracker housing positionable on the wellsite equipment, the tracker housing having an antenna chamber and a component chamber, the component chamber isolated from the antenna chamber by a barrier;
   a location antenna positioned in the antenna chamber, the location antenna coupled to a plurality of coordinate satellites to receive location data therefrom, the location data comprising three-axis coordinate data;
   a location unit positioned in the component chamber and coupled to the location antenna to receive the location data therefrom, the location unit comprising a clock and a location processor to receive the location data over time and to infer tracking data based on the location data and the time, the tracking data comprising spatial location and the time of the wellsite equipment based on the location data; and
   a tracker communicator comprising a communication unit and a communication antenna, the communication unit positioned in the component chamber and coupled to the location unit to receive the tracking data therefrom, the communication antenna positioned in the antenna chamber and coupled to the communication unit to receive the tracking data therefrom, the communication antenna extending through the tracker housing to transmit the tracking data about the wellsite.

2. The wellsite tracker of claim 1, wherein the wellsite equipment comprises a transporter movable about the wellsite.

3. The wellsite tracker of claim 1, further comprising a power supply positioned in the component chamber and coupled to at least one of the communication unit and the location unit.

4. The wellsite tracker of claim 1, wherein the location unit further comprises memory.

5. The wellsite tracker of claim 1, further comprising a wellsite monitor positioned in the tracker housing, the wellsite monitor coupled to the location unit to receive and process the location data and the tracking data over the time.

6. The wellsite tracker of claim 5, wherein the wellsite monitor comprises a monitor processor, a monitor communicator, a memory, an input/output (I/O) device, and a computer readable medium.

7. The wellsite tracker of claim 1, further comprising a cable coupled between the communication unit and the communication antenna.

8. The wellsite tracker of claim 1, further comprising a cable coupled between the location unit and the location antenna.

9. The wellsite tracker of claim 1, wherein the tracker housing comprises a heavy duty non-conductive material and wherein the barrier comprises a metal plate.

10. A wellsite monitoring system for monitoring wellsite equipment at a wellsite, the wellsite monitoring system comprising:

the wellsite tracker of claim 1; and a wellsite monitor coupled to the communication antenna of the wellsite tracker to receive the tracking data therefrom, the wellsite monitor comprising a monitor processor to generate outputs based on the location data.

11. The wellsite monitoring system of claim 10, wherein the wellsite monitor further comprises a monitor communicator, a memory, an input/output device, and a computer readable medium.

12. The wellsite monitoring system of claim 10, further comprising sensors positioned about the wellsite equipment.

13. The wellsite monitoring system of claim 12, wherein the sensors comprise another wellsite tracker, a well sensor, an equipment sensor, a wireline sensor, an injection sensor, and combinations thereof.

14. The wellsite monitoring system of claim 10, wherein the wellsite monitor comprises a plurality of wellsite monitors, each of the plurality of wellsite monitors positioned about the wellsite equipment.

15. The wellsite monitoring system of claim 14, wherein the wellsite monitor further comprises a monitor antenna, the wellsite monitor coupled to the communicator antenna by the monitor antenna for receiving the tracking data therefrom.

16. The wellsite monitoring system of claim 14, wherein the plurality of wellsite monitors are coupled together by communication links.

17. The wellsite monitoring system of claim 10, wherein the wellsite monitor is positioned within the wellsite tracker.

18. The wellsite monitoring system of claim 10, wherein the wellsite equipment comprises a transporter, a crane, equipment storage, well equipment, a surface unit, surface equipment, a downhole tool, a winch, a wireline truck, an injection truck, an offsite unit, and combinations thereof.

19. A method of monitoring wellsite operations at a wellsite, the method comprising:

positioning the wellsite tracker as in claim 1 about the wellsite equipment at the wellsite, the wellsite equipment comprising a transporter;

using the wellsite tracker, receiving the location data from a plurality of satellites as the wellsite equipment moves about the wellsite;

inferring the tracking data for the wellsite equipment based on the location data over the time, the tracking data comprising the spatial location and the time of the wellsite equipment; and confirming wellsite operations by comparing the tracking data for the wellsite equipment with predetermined specifications.

20. The method of claim 19, further comprising generating outputs from the tracking data.

21. The method of claim 20, wherein the outputs comprise maps, charts, reports, analysis, alarms, feedback, control decisions, and combinations thereof.

22. The method of claim 20, wherein the generating comprises generating an alarm when the tracking data is outside of a predetermined range of the predetermined specifications.

23. The method of claim 19, further comprising collecting wellsite data from sensors positioned about the wellsite.

24. The method of claim 23, further comprising generating integrated wellsite parameters based on the tracking data with the wellsite data.

25. The method of claim 24, further comprising confirming the wellsite operations by comparing the integrated wellsite parameters with predetermined wellsite specifications.

26. The method of claim 19, further comprising activating the wellsite equipment by generating an activation signal based on the tracking data and sending the activation signal to the wellsite equipment.

27. The method of claim 26, wherein the activating the wellsite equipment comprises opening/closing a valve at a wellhead and wherein the activation signal comprises a command to open/close the valve.

28. The method of claim 19, further comprising adjusting the wellsite operations based on the tracking data.

* * * * *